(12) United States Patent
Basile

(10) Patent No.: US 7,609,944 B2
(45) Date of Patent: Oct. 27, 2009

(54) COPY PROTECTION OF OPTICAL DISCS

(75) Inventor: Carmen Laura Basile, Maidenhead (GB)

(73) Assignee: Macrovision Corporation, Santa Clara, CA (US)

(*) Notice: Subject to any disclaimer, the term of this patent is extended or adjusted under 35 U.S.C. 154(b) by 293 days.

(21) Appl. No.: 11/481,605

(22) Filed: Jul. 5, 2006

(65) Prior Publication Data

US 2008/0022125 A1 Jan. 24, 2008

(51) Int. Cl.
- H04N 5/00 (2006.01)
- H04N 5/91 (2006.01)
- H04K 1/00 (2006.01)
- G06F 11/00 (2006.01)
- G06F 11/30 (2006.01)
- G06F 13/00 (2006.01)
- G11C 29/00 (2006.01)

(52) U.S. Cl. .......... 386/95; 386/125; 386/126; 713/182; 713/189; 713/193; 714/52; 714/720; 714/735; 726/21

(58) Field of Classification Search .......... 386/95, 386/125, 126; 713/182, 189, 193; 714/52, 714/720, 735; 726/21
See application file for complete search history.

(56) References Cited

U.S. PATENT DOCUMENTS

| | | | |
|---|---|---|---|
| 6,839,312 | B2 | 1/2005 | Heylen et al. |
| 7,062,686 | B2 * | 6/2006 | Moritomo .......... 714/52 |
| 2002/0076046 | A1 | 6/2002 | Heylen et al. |
| 2003/0101140 | A1 | 5/2003 | So et al. |
| 2005/0019017 | A1 * | 1/2005 | Green .......... 386/95 |
| 2007/0036527 | A1 | 2/2007 | Kim |
| 2008/0219123 | A1 | 9/2008 | Basile et al. |

FOREIGN PATENT DOCUMENTS

KR 10-2004-0075242 A 8/2004

(Continued)

OTHER PUBLICATIONS

"International Search Report and Written Opinion", PCT/US07/14365, (Aug. 26, 2008), 9 pgs.

(Continued)

Primary Examiner—Thai Tran
Assistant Examiner—Syed Y Hasan
(74) Attorney, Agent, or Firm—Schwegman, Lundberg & Woessner, P.A.

(57) ABSTRACT

To copy protect an optical disc, such as a DVD, program chains additional to the main program chain are provided. These program chains may lead to the genuine data but in an incomplete or incorrect order or to false data. Sufficient additional program chains are provided to make it difficult to identify the main program chain amongst all of the program chains provided on the disc. The structure of the further program chains ape that of the main program, again to hide the main program chain. The navigation path which leads to the main program chain, and hence to the content on the DVD, is dynamically generated and at least some of the information required to generate the navigational path arises by setting parameters associated with a player or with a user. Thus a search of all of the navigation information on the disc will fail to reveal the navigation path to the content.

32 Claims, 17 Drawing Sheets

FOREIGN PATENT DOCUMENTS

| WO | WO 00/74053 A1 | 12/2000 |
|----|----------------|---------|
| WO | WO 01/61695 | 8/2001 |
| WO | WO 01/61696 | 8/2001 |
| WO | WO 02/11136 A1 | 2/2002 |
| WO | WO-2005081245 A2 | 9/2005 |

OTHER PUBLICATIONS

"International Application Serial No. PCT/US2008/002633, International Search Report mailed Jun. 17, 2008", 4 pgs.

"International Application Serial No. PCT/US2008/002633, Written Opinion mailed Jun. 17, 2008", 6 pgs.

* cited by examiner

COPY PROTECTION OF OPTICAL DISCS

BACKGROUND TO THE INVENTION

The present invention relates to a method of copy protecting an optical disc carrying content and control data and to such a copy protected optical disc.

There are many techniques for copy protecting optical discs. For example, WO 00/74053 proposes copy protecting audio data on a digital audio compact disc (CD-DA) by rendering control data encoded onto the disc incorrect and/or inaccurate. The incorrect data encoded onto the CD is either inaccessible to, or not generally used by, a CD-DA player. Therefore a legitimate audio CD can be played normally on a compact disc music player, but the incorrect data renders the protected audio data on the CD unplayable by a CD-ROM drive.

As this earlier copy protection method prevents the user from using a CD-ROM drive legitimately simply to play the music or other audio on a CD-DA, alternative methods of copy protection have been proposed which, whilst preventing the production of usable copy discs, do not prevent or degrade the playing of legitimate optical discs on all players having the functionality to play such optical discs. Examples of such copy protection methods are described in WO 01/61695 and in WO 01/61696.

These further methods remove, corrupt, or otherwise render inaccurate control data associated with the information on the disc.

It is also known to provide a copy protected disc where at least one region of the content contains unreadable or subversive data, and access to these regions of unreadable or subversive data is prevented during normal playback of the disc. Similarly, however, copying techniques are now known where it is possible to parse the navigation structure on a disc and select the main feature by choosing, for example, a program chain having the longest presentation time, hence skipping any unnecessary or subversive data. This makes the copying process quite straightforward, as no knowledge of the navigation structure of a DVD is required and all unwanted content such as copyright warnings or trailers may be skipped while copying. This copying technique is known as IFO parsing ripping.

SUMMARY OF THE PRESENT INVENTION

The present invention seeks to provide a copy protection method that would frustrate a person attempting to copy the content of an optical disc.

According to a first aspect of the present invention there is provided a copy protected optical disc carrying content and control data, the content comprising at least one region of genuine data and at least one region of false data and the control data comprising navigational information to enable access to the data, wherein the navigational information includes at least one main program chain leading to the region of genuine data, wherein the navigational information also includes one or more further program chains, each said further program chain leading to the at least one region of false data, and/or incompletely and/or incorrectly leading to the region of genuine data, where the structure of at least one of the further program chains apes the structure of the main program chain, and wherein the control data is arranged to generate a dynamic navigational path to enable access to the main program chain upon the setting of parameters associated with a player or a user.

The provision of additional program chains will render it difficult for a person attempting to copy the optical disc to ascertain where exactly the main presentation data is held.

Furthermore, as access to the main program chain requires the generation of a dynamic navigational path, a search of the navigational information stored on the disc will not identify the main program chain.

The dynamic navigational path providing access to the main program chain is generated upon the setting of parameters associated with a player or user. These parameters are set, for example, upon activation of a user interface.

Typically, the navigational commands leading to the main program chain, and thus the main presentation data, will only become available once a play button available for selection on initialization of an optical disc by a player has been activated.

Preferably, for any given feature characterising the main program chain, for example, the presentation time, the number of chapters, there is provided at least one further program chain sharing one or more of those features, thus leading to further confusion for a person attempting to copy the content of the optical disc.

Additionally, and/or alternatively, at least one further program chain should be virtually indistinguishable from the main program chain, thus leading to further confusion for a person attempting to copy the content of the optical disc.

Preferably, the at least one region of false data will comprise one or more of incorrect data, dummy data and subversive data. A further program chain may lead to false data only or may lead to a combination of false data and genuine data. Additionally and/or alternatively, a further program chain may lead to genuine data but access only parts of the genuine data and/or access the genuine data in an incorrect order.

Preferably, the content is arranged in a data area provided between a Lead-In and a Lead Out, the data area comprising a hierarchical data structure having several levels and having navigational information associated with the individual levels.

The navigational information further includes one or more titles, at least one of which forms part of the navigation path leading to the main program chain. The content files are video object (VOB) files arranged in individual cells which can each be accessed by respective pointers in an information (IFO) file.

Preferably, each program chain comprises further navigational information corresponding to one or more programs leading to the individual cells of content files.

In a preferred embodiment, the navigational path is arranged to be generated in accordance with conditional instructions associated with one or more of the program chains, cells and/or menu buttons.

Thus, pre-command, post-command and cell command instructions can be used to confuse a copying device attempting to detect the main program chain by providing an indirect path to the main presentation data. The conditional instructions may utilise one or more of the further program chains to complicate the navigation path if required.

Preferably, the conditional instructions located in the pre-command, post-command and cell command areas require parameters to be set to satisfy the conditional instructions required to enable generation of the correct navigational path. These parameters are arranged to be set by a user interface and/or by a player during normal playback of the optical disc.

Thus, unless the optical disc is played or a virtual machine emulating a player is used, part of the navigation path will remain inconclusive and it will not immediately be clear to a person and/or an IFO parsing copying device attempting to copy the optical disc where the main presentation data is held and/or which program chain is the main program chain.

For example, on initialization of an optical disc, a parameter G(0) may be set at 1 by the player. The first conditional instruction found in a pre-command area of an entry program chain requires G(0) to equal 1 to enable the player to jump to the main program chain leading to the main presentation data. If G(0) does not equal 1, then the resulting navigation path would lead to false data. Therefore, unless this parameter is known to be set to 1 on initialization of the optical disc by a player, the navigation path leading to the main presentation data will not be known.

The present invention also extends to a method of copy protecting an optical disc carrying content and control data, the content comprising at least one region of genuine data and at least one region of false data, the method comprising:

providing control data comprising navigational information arranged to enable access to the data, wherein the navigational information includes at least one main program chain leading to the region of genuine data and one or more further program chains, each further program chain leading to the at least one region of false data, and/or incompletely and/or incorrectly leading to the region of genuine data, where the structure of at least one of the further program chains apes the structure of the main program chain; and providing additional control data arranged to generate a navigational path that is dynamically determined upon the setting of parameters associated with a player or a user.

The provision of additional program chains will render it difficult for a person attempting to copy the optical disc to ascertain where exactly the main presentation data is held. Typically, the navigational commands leading to the main program chain, and thus the main presentation data, will only become available once a play button available for selection on initialization of an optical disc by a player has been activated.

Additionally, and/or alternatively, for any given feature characterising the main program chain, for example, the presentation time, the number of chapters, there is provided at least one further program chain sharing one or more of those features, thus leading to further confusion for a person attempting to copy the content of the optical disc.

Additionally, and/or alternatively, at least one further program chain should be virtually indistinguishable from the main program chain, thus leading to further confusion for a person attempting to copy the content of the optical disc.

In a preferred embodiment, the region of false data comprises one or more of incorrect data, dummy data and subversive data.

In an embodiment, the content is arranged in a data area provided between a Lead-In and a Lead Out, the data area comprising a hierarchical data structure having several levels and having navigational information associated with the individual levels.

Preferably, the navigational information further includes one or more titles, at least one of which forms part of the navigation path leading to the main program chain.

In a preferred embodiment, the content files are video object (VOB) files arranged in individual cells which can each be accessed by respective pointers in an information (IFO) file.

Preferably, each program chain comprises further navigational information corresponding to one or more programs leading to the individual cells of content files.

Additionally, and/or alternatively, a method of the invention further comprises associating conditional instructions with one or more of the program chains, cells and/or menu buttons; and arranging for the navigational path to be generated in accordance with said conditional instructions.

Preferably, a method of the invention further comprises providing parameters required to satisfy the conditional instructions arranged to enable generation of the correct navigational path enabling access to the main program chain, wherein said parameters are arranged to be set by a user interface and/or by a player during normal playback of the optical disc.

According to a further aspect of the present invention there is provided an instruction set for use in copy protecting an optical disc, the instruction set including:

instructions to provide on a disc navigational information arranged to enable access to data, including:

instructions for providing a main program chain leading to a region of genuine data; and instructions for providing one or more further program chains, each further program chain leading to the at least one region of false data and/or incompletely or incorrectly leading to the region of genuine data, where the structure of at least one of the further program chains apes the structure of the main program chain; and instructions to provide control data arranged to generate a navigational path that is dynamically generated to enable access to the main program chain upon the setting of parameters associated with a player or user.

DESCRIPTION OF PREFERRED EMBODIMENTS

The present invention is applicable to optical discs in general, but is described herein with reference to DVD formats.

The process for formatting the user data to be applied to a DVD is in accordance with agreed conventions and is well understood. However, for clarity, the manner in which the data is formatted according to the DVD standards will now be briefly described. This process is applicable to all formats of DVD.

Figure 1:
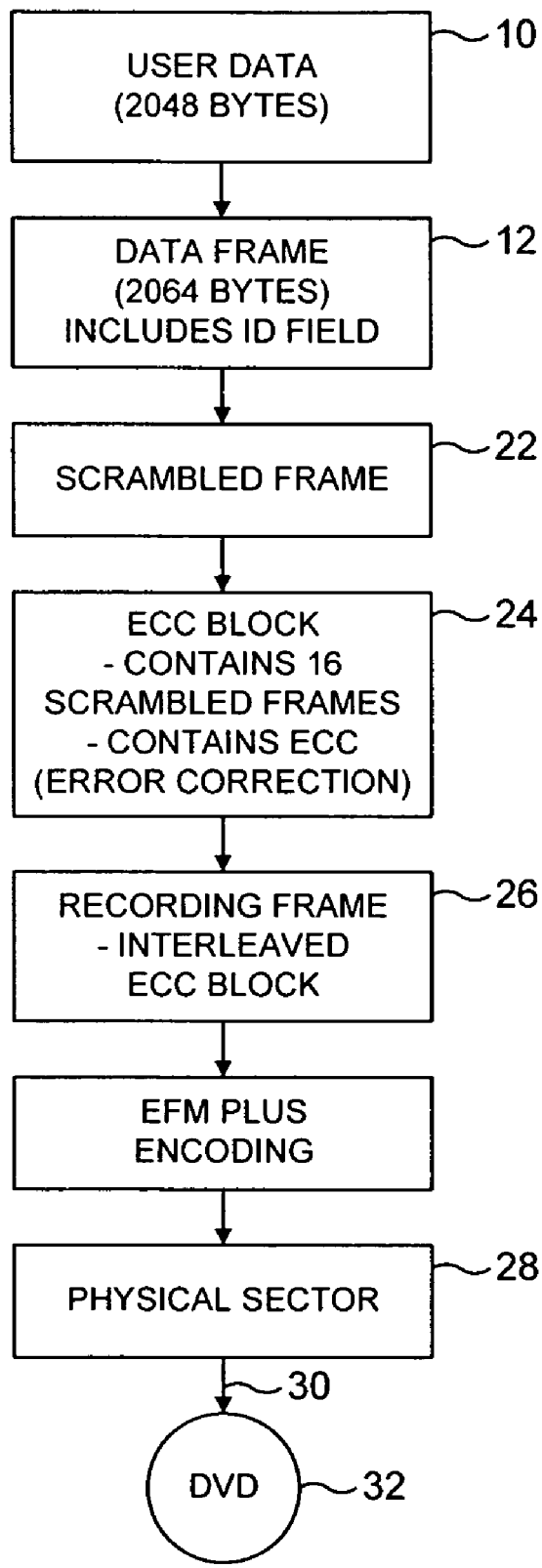
FIG. 1 shows schematically the writing of data to a DVD disc.

FIG. 1 shows the steps which are taken in formatting user data to be applied to a DVD. This user data is the information which is to be written to, and accessed from the disc and may comprise text, graphics, video, audio, programs and other content, and control data. As is indicated in FIG. 1, the user data is organised into blocks 10 which each contain 2,048 bytes. The first step in the formatting is to incorporate each block 10 of user data into a corresponding data frame 12 which has 2,064 bytes. The additional bytes incorporate identification and error correction codes.

As is further shown in FIG. 1, the data frame 12 is then scrambled to form a scrambled frame 22. This scrambling is to remove repeated sequences of data. The scrambling may be performed by XORing sixteen consecutive data frames with a first table and then XORing the next sixteen consecutive data frames with a second table and so on. The scrambled frame 22, therefore, includes 16×16 data frames 12.

Next an ECC block 24 is formed by error correction encoding in which sixteen consecutive scrambled frames 22 are arranged into an array having 192 rows each containing 172 bytes. To each of the 172 columns, sixteen bytes of "outer parity" are added and to each of the resulting 208 rows ten bytes of "inner parity" are added. These parity bytes are error correction codes related to the data in the rows and columns by known and understood error correction techniques.

The ECC block 24 is then input to interleaving means to create sixteen recording frames 26. These recording frames 26 are created by interleaving rows from the ECC block 24. Thus, the 37,856 bytes contained in the ECC block 24 are rearranged into sixteen recording frames $R_0, R_1, \ldots R_{15}$ each of which has 2,336 bytes. Since each recording frame R has 182 columns there are sixteen recording frames each consisting of 13 rows.

Figure 2:
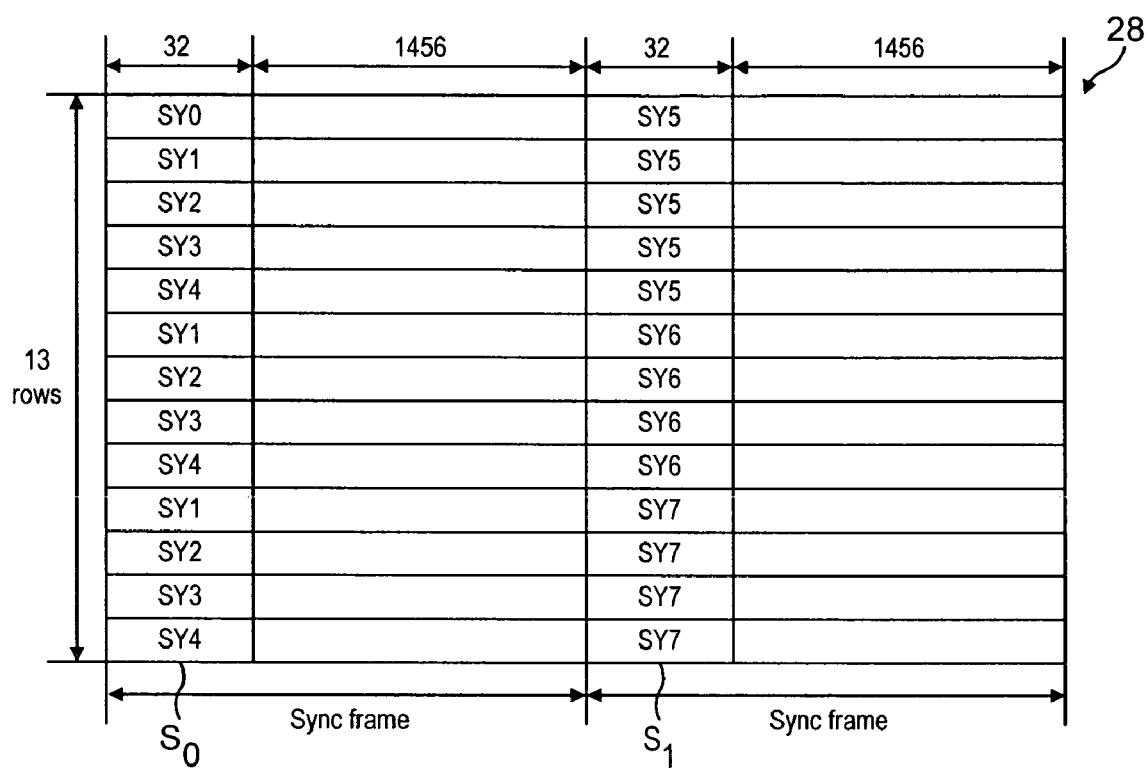
FIG. 2 shows a physical sector formed during formatting of the data to be written to a DVD disc.

The recording frames 26 are then subjected to EFM Plus encoding whereby a sequence of bits, that is, a series of 0s and 1s, is produced. Thereafter the data is arranged into sixteen physical sectors 28. One physical sector 28 is shown in FIG. 2. As can be seen, the EFM Plus encoded data from each recording frame is split down the middle and four byte sync codes $S_0$, and $S_1$ are inserted in front of each half row. Thereafter, the resulting sequence of bits 30 is applied to a disc 32.

EFM Plus encoding processes the data with 8 to 16 modulation, that is each eight bit byte is translated into a sixteen bit byte. This is done by selecting each sixteen bit code from a set of four tables. The encoding is arranged to maintain a low level of DSV (Digital Sum Value).

The bit stream 30 is written to the disc 32 by an appropriate mastering means to form pits and lands. In this respect, in a DVD writer the mastering means will generally be a laser beam recorder. Laser beam recorders are also used in mastering houses, but alternative mastering techniques are available and may be utilised.

Figure 3:
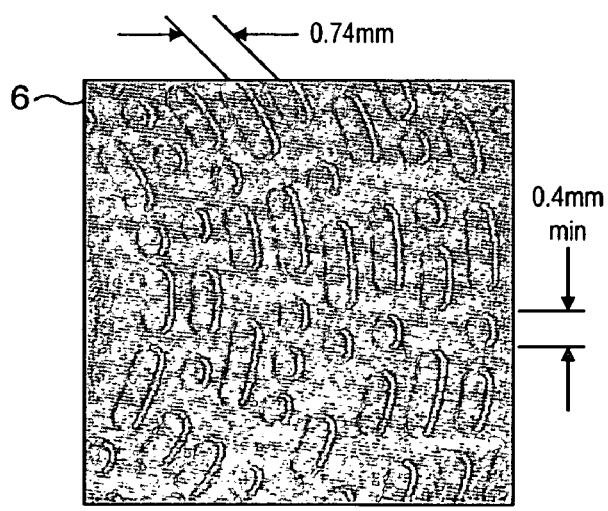
FIG. 3 shows an enlarged part of the surface of a DVD.

FIG. 3 shows an enlarged part of a DVD showing the pits 6 thereon. As is well known, these pits extend along a spiral track on the surface of the disc 32 and are separated by lands.

Figure 4:
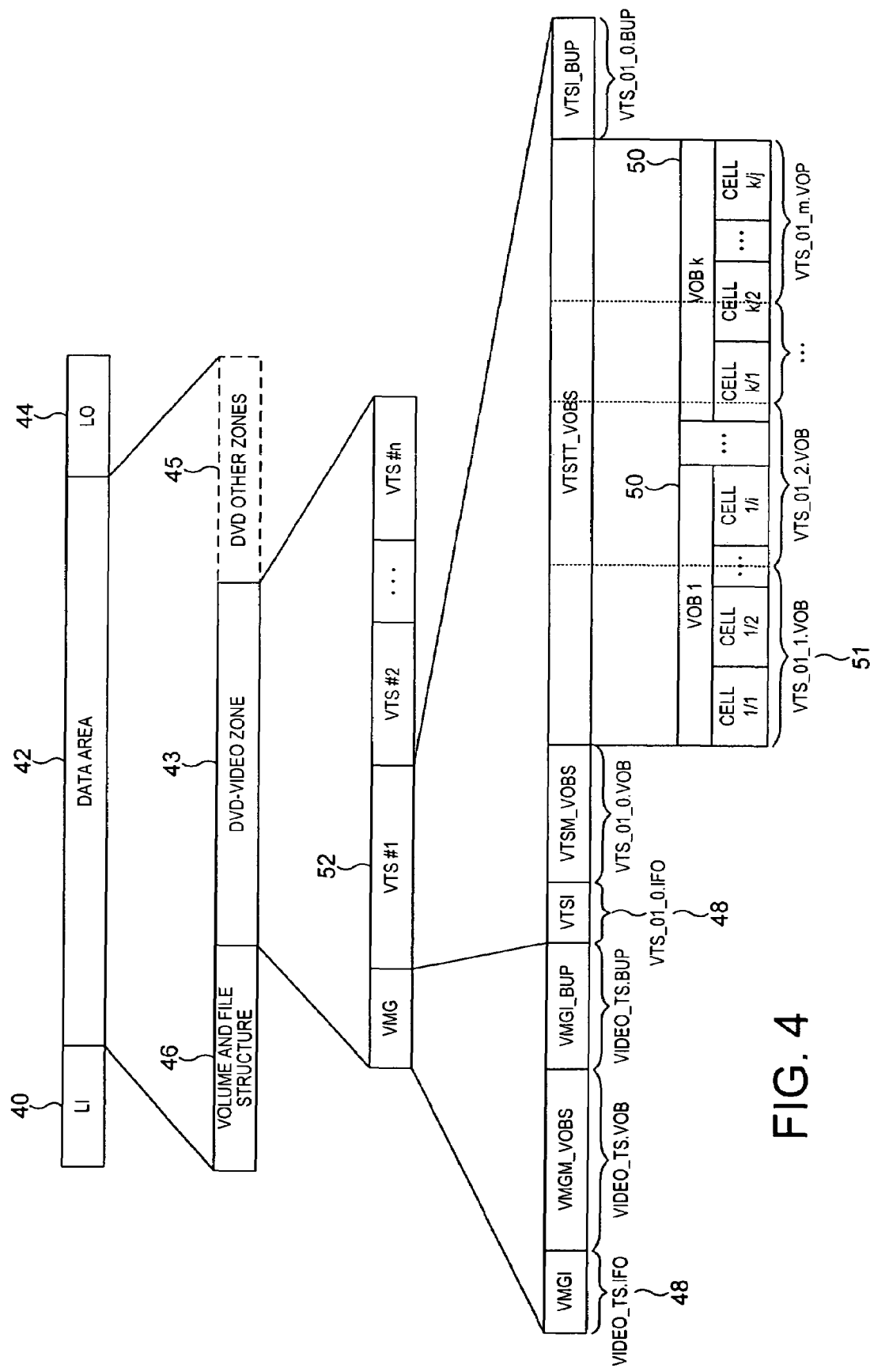
FIG. 4 shows the structure of data on a DVD.

The data on the DVD is arranged along the spiral track. As shown in FIG. 4, this data is structured to have a Lead-in 40, a data area 42 and a Lead-out 44.

The structure of the data on the DVD is the subject of standards, and is well known to those skilled in the art. Accordingly, only parts of the data structure of a DVD-Video which are relevant to the present invention are described and illustrated herein. As is further indicated in FIG. 4, the data area 42 includes a volume descriptor 46 which identifies the structure and contents of the data in the data area 42. This volume descriptor 46 is followed by a DVD-Video zone 43 and possibly by other DVD zones 45. The DVD-Video zone 43 comprises structures such as a Video Manager (VMG) and a number of video title sets (VTSs).

Information files (IFO) 48 are provided in the Video Manager (VMG) and in each of the video title sets (VTSs) and provide the syntax by which navigation to video objects (VOBs) 50 is achieved. As is well known, each video object 50 contains MPEG streams, such as video, audio, and other content streams. The other content streams may comprise text and graphics, for example. A video object 50 also includes control data for controlling the presentation of its content together with control data enabling the data within the video object to be searched. The video objects 50 compose a set of video objects for the titles (VTSTT_VOBS) in video title set VTS#1. The VTSTT_VOBS is divided into video object files 51 whose size does not exceed 1 GB.

Figure 5:
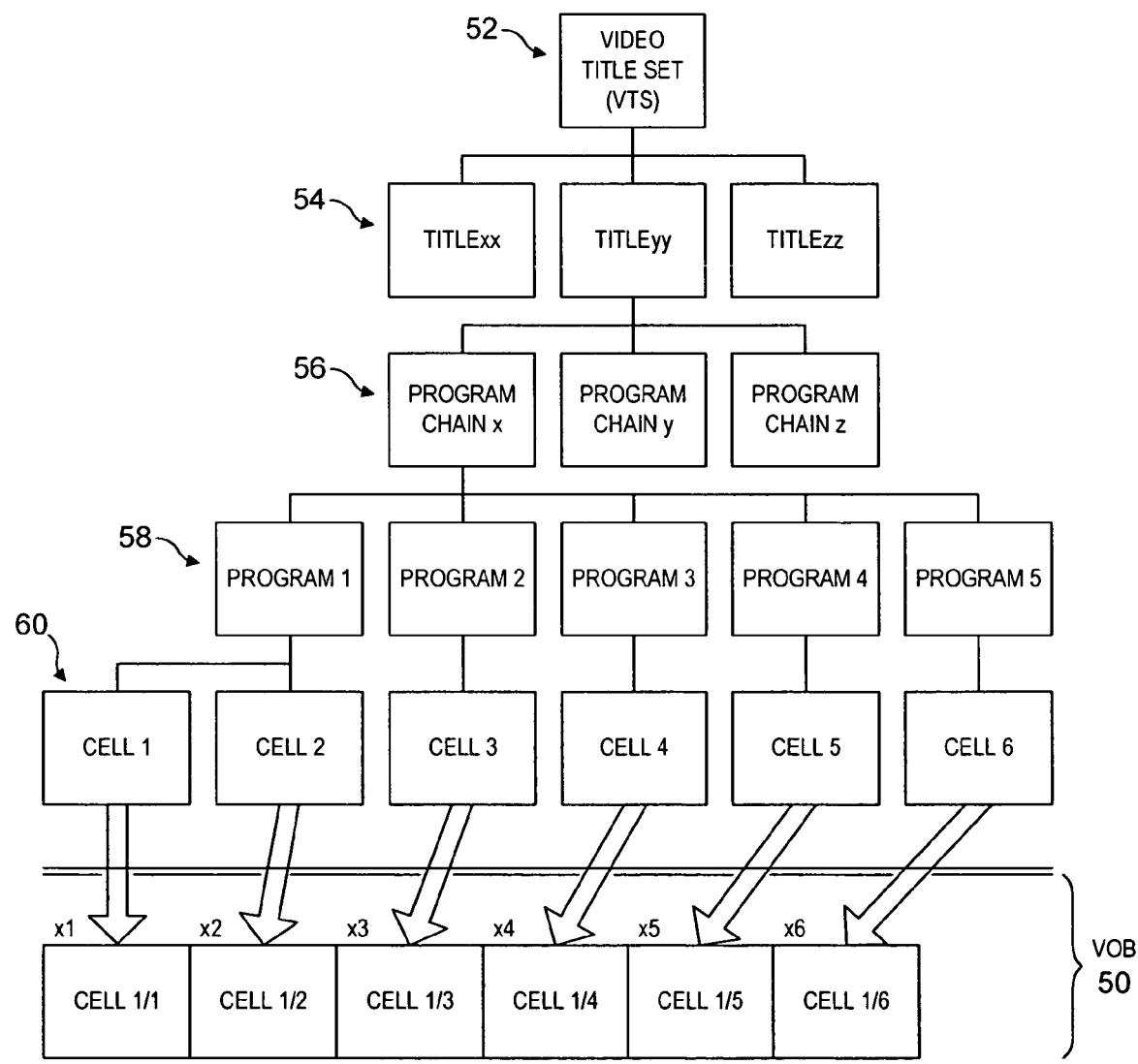
FIG. 5 shows an example of the structure of a video title set (VTS) in a DVD.

FIG. 5 shows an example of the structure of a video title set (VTS) and illustrates how, in a DVD, a movie, for example, stored in a single video object 50, can be accessed and navigated and thereby played.

In FIG. 5, not all of the connections and pointers between files in the DVD-Video structure have been illustrated. Instead, FIG. 5 illustrates how a single video object 50 is addressed.

In the structure illustrated in FIG. 5 there is a video title set (VTS) 52 containing a collection of titles 54. Each title 54 includes one or more program chains 56. In FIG. 5, the title 54 "TITLE yy" addresses the chosen video object 50 and does so by way of program chain X. Each program chain 56 includes a number of individual programs as 58 which are typically arranged to be played in sequence. Each of the programs 58 has one or more pointers as 60, and each pointer 60 addresses a particular part of the corresponding video object.

As is illustrated in FIG. 5, each video object 50 is divided into a number of individual cells 70. Typically, each of the programs 58 points, by way of its pointer 60, to an individual one of the cells 70 of the video object 50. However it is possible as also indicated in FIG. 5 for a single program 58, as program 1, to have more pointers 60, for example, two pointers which address two cells 70, as cells 1/1 and 1/2. The arrangement is generally that, as the programs 58 are played in sequence by way of the relevant program chain 56, the cells 70 within the video object 50 are similarly accessed in order.

Figure 6:
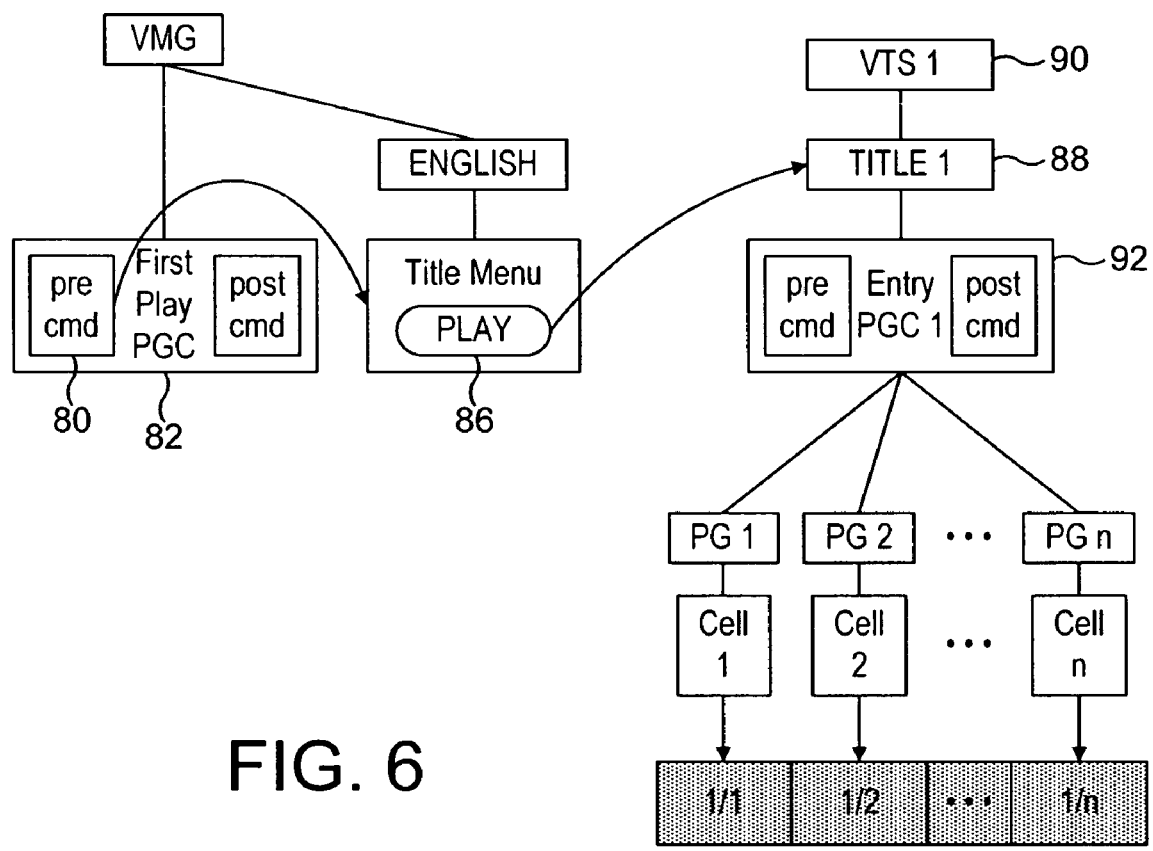
FIG. 6 shows schematically an example of the navigation structure on a DVD.

FIG. 6 shows schematically an example of the navigation structure on a standard DVD. On initialization of the DVD, a First Play Program chain (PGC) 82 is executed. A pre-command instruction of the First Play PGC results in the display of a Title Menu from which a user can select to play the main feature or, for example, additional scenes etc. In FIG. 6 only a PLAY button 86 in the Title Menu is diplayed. If, as shown in FIG. 6, the user chooses to play the main feature, when the user activates the PLAY button 86 of the Title Menu, navigation instructions are executed causing the player to jump to Title 1 88 within VTS 1 90 such that the main program chain (PGC 1) 92 that points to the main presentation data is executed. As described above, in these circumstances, each program is played in sequence by way of the relevant program chain, in this case Entry PGC 1 and the cells within the video object are similarly accessed in order.

Figure 7:
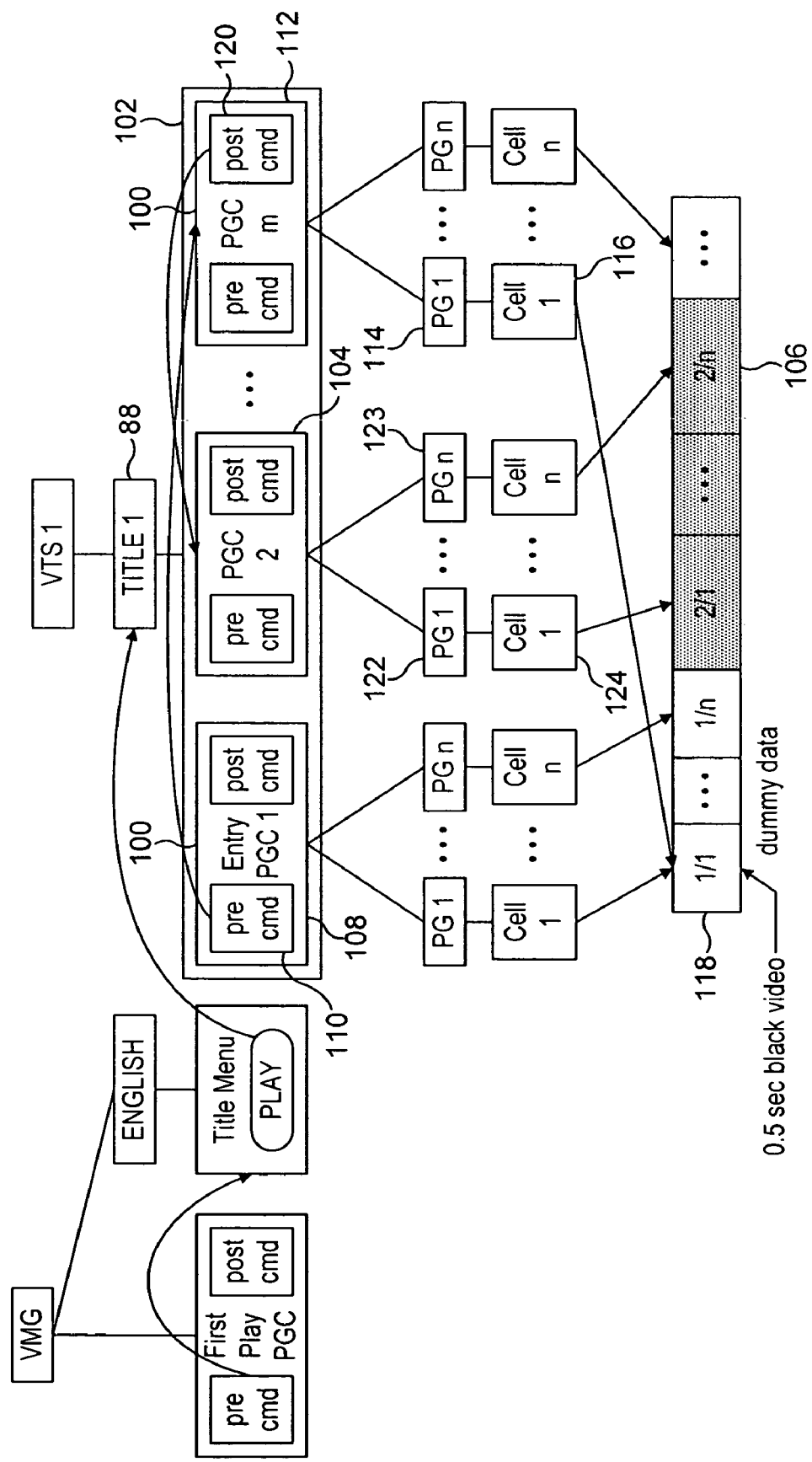
FIG. 7 shows a view similar to that of FIG. 6 but illustrating copy protection by the provision of a number of additional program chains.

FIG. 7 shows an arrangement of a DVD similar to that of FIG. 6 except that the DVD illustrated in FIG. 7 has been copy protected by an embodiment of the present invention. It will be seen, by a comparison of FIGS. 6 and 7, that a number of additional program chains 100 have been added to the main title 88. As can be seen in FIG. 7, of the program chains now shown, program chain 2 (PGC 2) 104 is the only one that correctly points to the main presentation data 106 in the correct order. As illustrated in FIG. 7, the remaining program chains point to false data. However, the remaining program chains could be directed to the genuine main presentation data but in a non-sequential order, to only part of the main presentation data, or to a combination of genuine and false data.

In the main, it is expected that a DVD copy protected by an embodiment of the present invention would offer a large number of program chains as possible candidates for the "main" program chain. Of these, only the main program chain will point correctly to the main presentation data. The main program chain forms part of the navigation path from the initialization commands to the data itself. Information on how to get from initialization to the main program chain is typically provided in response to activation of a user interface and forms more, or the remainder, of the navigation path. Navigation information may additionally and/or alternatively be provided in response to circumstances arising at a player. For example, parameters may be set in the player, or the player may follow a series of commands determined by the navigation structure. This means that the navigation path to the main program chain is only realised upon playback of the DVD by a player or by use of a suitable virtual machine emulating a player, that is, this navigation path is realised dynamically. Each of the other, large number of, program chains does not access the main presentation. The other program chains point to genuine data of the main presentation but in a non-sequential order, to false data, which may be subversive and/or dummy data, and/or to a combination of false data and genuine data.

In general, a program chain forms part of a navigation path that leads a player to the data content. As such, each program chain, and the corresponding programs, does not itself occupy much memory on the DVD. It is possible to add to the DVD a large number of additional "false" program chains. The DVD video specifications allow up to 99 titles on a DVD and up to $2^{15}-1$ program chains per title. Thus, it is possible to have up to 32,767 program chains per title, so up to over 3 million program chains per DVD. If, out of these 3 million program chains, only one accesses the main presentation, without all the relevant navigation information it would clearly be difficult for a person attempting to copy the DVD to determine which program chain accesses the genuine presentation data. Thus the provision of additional program chains would either result in a person and/or an IFO parsing copying device not being able to detect the main program chain, or would defer potential copying because of the amount of time required to sort through the data. As more program chains are included, it becomes less clear to see exactly which presentation data is accessed during normal playback. Therefore, adding additional "false" program chains is preferable to, for example, the addition of additional erroneous data content. Alternatively, the addition of erroneous data content may be used in conjunction with the addition of "false" program chains.

In the embodiment illustrated in FIG. 7, the additional program chains are intended to be virtually indistinguishable from the main program chain. This results in an even more confusing set of program chains and/or possible navigation paths from which a person or an IFO parsing copying device attempting to copy the DVD would have to choose. Having virtually identical program chains can be achieved by ensuring that all program chains have the same presentation time as the main program chain, or the same number of chapters together with a similar structure. In addition, for any feature recognisable in the main program chain, for example, the structure of the cell position information table, the command table, or the presence/absence of subversive data, there may be at least one other program chain sharing the same features.

The structure described above is intended to make the distinction between the main program chain and the other program chains difficult and/or erroneous for a person and/or an IFO parsing copying device attempting to copy the DVD.

As shown in FIG. 7, the second program chain (PGC 2) 104, the main program chain, includes a number of individual programs, namely PG 1 122 . . . PG n 123 which are typically arranged to be played in sequence. Each of the programs has one or more pointers that point to an individual cell to access the data, in this case the main presentation data 106. The remaining program chains (PGC 1, PGC 3, . . . ,PGC m) 100 point to either dummy or unreadable data. In an alternative embodiment, not shown, it would be possible for the remaining program chains to point to the same presentation data, but in a non-sequential order. Thus if a person or a copying device attempting to copy the DVD were to choose one of these alternative program chains, the copying process would fail and/or any data copied would either fail on playback, or would not be sensible.

The various program chains for the main title may be arranged into a program chain block (PGC block). As exemplified in FIG. 7, during normal playback of the DVD, after a user has activated the PLAY button of the title menu, the main title (Title 1) is accessed and the Entry PGC 1 108 is executed. Each program chain is programmed to have pre-command, post-command and cell command instructions. These instructions determine the dynamic navigation path that eventually directs the player to the main presentation data. The pre-command, post-command and cell-command instructions can be programmed to perform various functions, including re-directing the player to a different title, program chain, program or cell.

The pre-command 110 of Entry PGC 1 108 is programmed to cause the player to jump from Entry PGC 1 108 to PGC m 112. Following the sequential chain, program 1 114, comprising cell 1 116, of PGC m is subsequently executed resulting in the presentation of 0.5 seconds of black video that is held in Cell 1/1 118. A cell command in Cell 1 subsequently directs the player to the post-command phase 120 of PGC m, which in turn directs the player to the main program chain PGC 2 104.

Following the normal sequential chain, program 1 122, comprising cell 1 124 of PGC 2 is executed, followed by the remaining programs and cells of PGC 2 in sequential order. As can be seen in FIG. 7, this results in the main presentation data 106 being accessed and presented.

As described above and shown in FIG. 7, the main program chain may be selected and presented after a long series of transitions from one program chain to another, by means of, possibly conditional pre-commands, post-commands and cell commands, in such a way that the path followed by a player during playback would be difficult to follow from the information contained in the IFO files.

As exemplified in FIG. 7, to cause maximum confusion to a person and/or an IFO parsing copying device attempting to copy the relevant data from the DVD by looking at the control data, each program chain has the same number of programs, in this case n.

Figure 8:
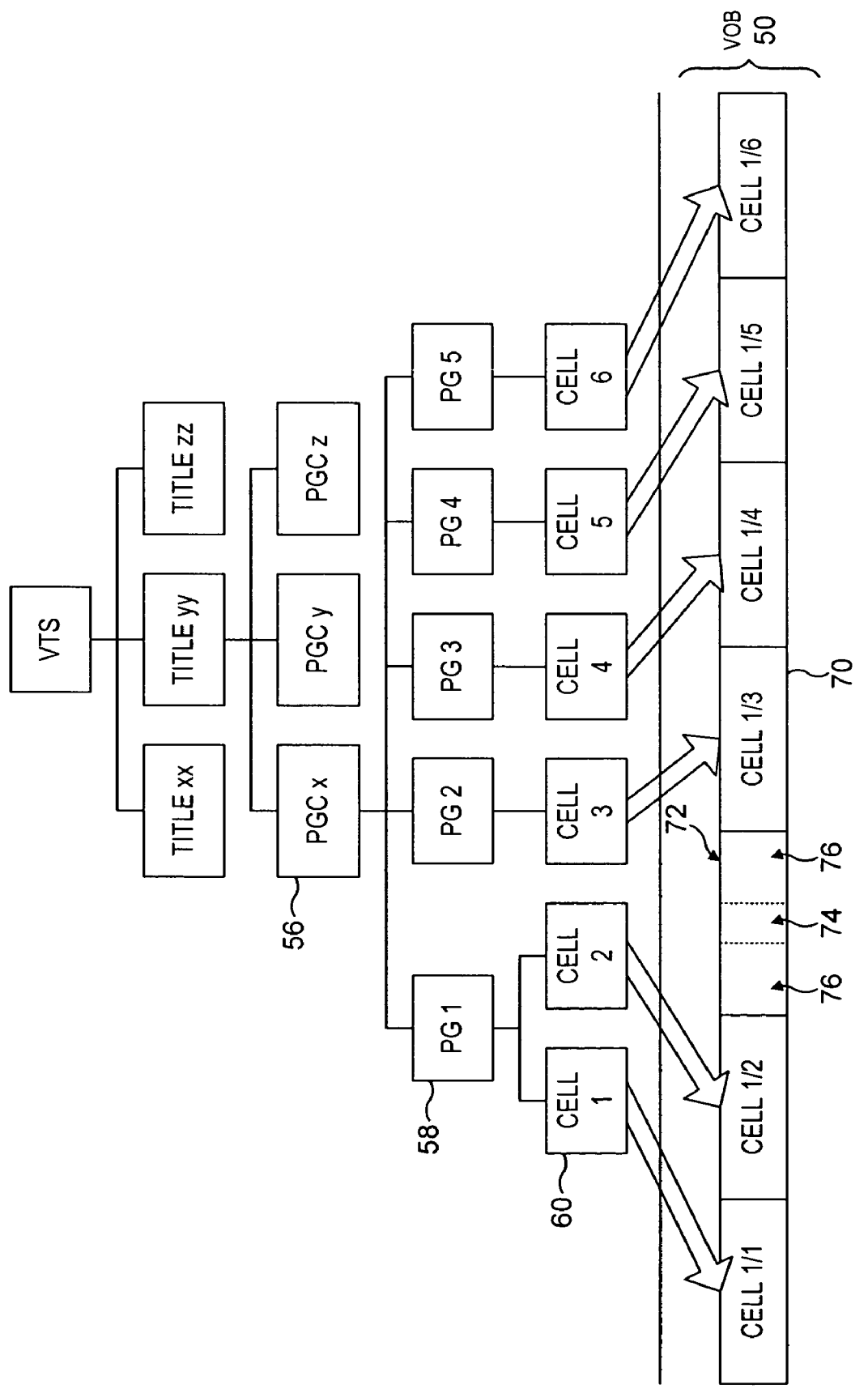
FIG. 8 shows a view similar to that of FIG. 5 but illustrating the addition of copy protection by the provision of an additional cell in a video object.

FIG. 8 shows an arrangement of a structure of cells of a DVD similar to that of FIG. 5 except that the DVD illustrated in FIG. 8 has additional copy protection. It will be seen, by a comparison of FIGS. 5 and 8, that an additional cell 72 has been interposed between two cells 70 of the video object 50. As is also shown in FIG. 8, subversive data indicated at 74 has been incorporated within the additional cell 72. There is a buffer area 76 on either side of the subversive data 74 within the additional cell.

The subversive data 74 in the additional cell 72 of the video object 50 may be any data which will stop or subvert a drive reading or playing the content of the region 72 on an optical disc, and/or will stop or significantly slow down the copying of data from the optical disc and/or will prevent usable copies of data on the disc being made. Alternatively, the subversive and/or dummy data may consist of any content that would be of no value to the user, including copied portions from the main presentation data. Examples of subversive data which meet these requirements include data with incorrect error correcting codes, and information which has been deliberately altered. The data might be, or include, data patterns chosen to cause DSV problems, for example, chosen to ensure that the DSV has a significant absolute value and/or that the DSV has a rapid rate of change. A description of DSV data patterns and the problems they cause is given, for example, in WO 02/11136. It is additionally and/or alternatively possible to provide data which has mistimed waveform transitions.

In the main, it is expected that values of the data, which may be content and/or control data, will be changed during encoding of the data onto the optical disc whereby the subversive data is produced. However, it is additionally and/or alternatively possible to provide subversive data on the optical disc by mechanically or physically damaging bits or sectors of bits on the disc.

Examples of data which has been altered, and which can therefore provide subversive data for use in embodiments of the invention are described, for example, in WO 00/74053, WO 01/61695 and WO 01/61696. Any or all of such subversive data may be used in the present invention.

When an attempt is made to read data from a copy protected disc as including subversive data, it is possible that the subversive data 74 in the additional cell 72 will cause the read operation of the disc to fail or to be slowed significantly. Alternatively, the subversive data may result in the generation of error flags which will mean that any copy that the device is able to make will generally be unplayable.

As illustrated in FIG. 8, subversive data 74 may be included in the video object 50 by inserting therein an additional cell 72 also containing buffering zones 76.

Figure 9:
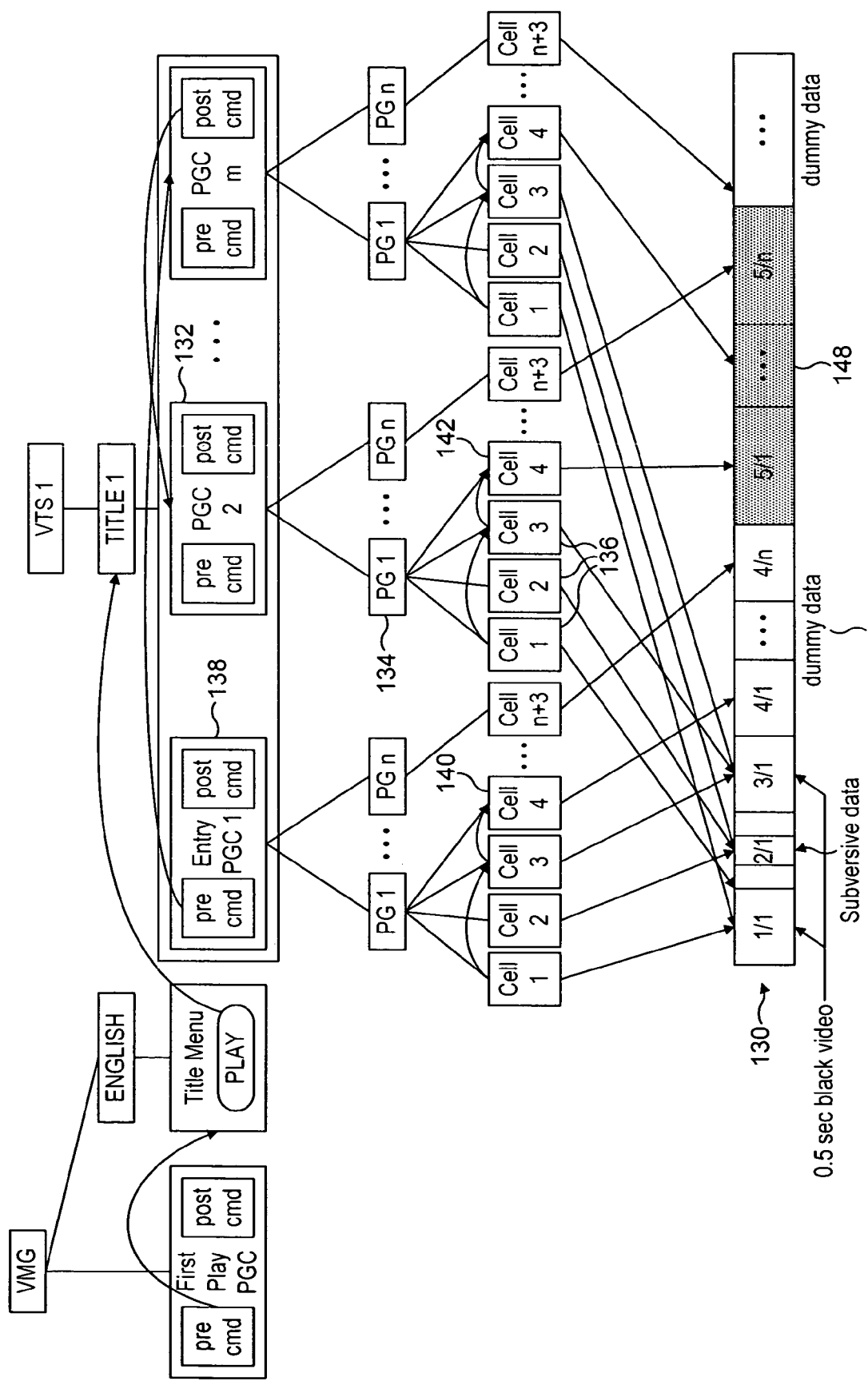
FIG. 9 is a view similar to that of FIG. 7 but includes copy protection as illustrated in FIG. 8.

FIG. 9 shows an arrangement similar to that of FIG. 6 except that the DVD data 130 has additional copy protection as described above. In this embodiment, the first program 134 of the main program chain (PGC 2) 132 contains three additional cells 136, that each point to subversive data included in the data content. During normal playback, the dynamic navigation path formed upon activation of the play button would direct the player to the main program chain, PGC 2 132. As previously, this subsequently results in the execution of the first program PG 1 134. In this embodiment, PG 1 134 has pointers that point to cell 4 142 and three additional cells, cells 1, 2 and 3 136. Upon execution of the first of these additional cells, a cell command is executed that instructs the player to skip cell 2 and lead directly to cell 3. Cell 3 additionally contains a cell command instructing the player to jump to cell 4 that points to the main presentation data. Other program chains in the PGC block may have a structure similar to PGC 2, for example, the structure of PGC 1 138 is virtually identical to PGC 2. However, in contrast to PGC 2, cell 4 140 of PGC 1 is directed to dummy data 146. PGC m is identical to PGC 2 except for the absence of any cell commands allowing the player to jump over the subversive data within Cell 2/1.

As a result of the complexity of the various pre-commands, post-commands and cell commands, it is not immediately apparent on looking at the VTS or the program chains where the presentation data is held. Specifically, a person and/or an IFO parsing copying device attempting to copy the DVD would see a number of program chains, seemingly all pointing to the same data and all having a very similar structure and would thus find it hard to distinguish which program chain is directed to the presentation data. Again, to make it more difficult for a person attempting to copy the data, the presentation time of each program chain should be similar.

Figure 10:
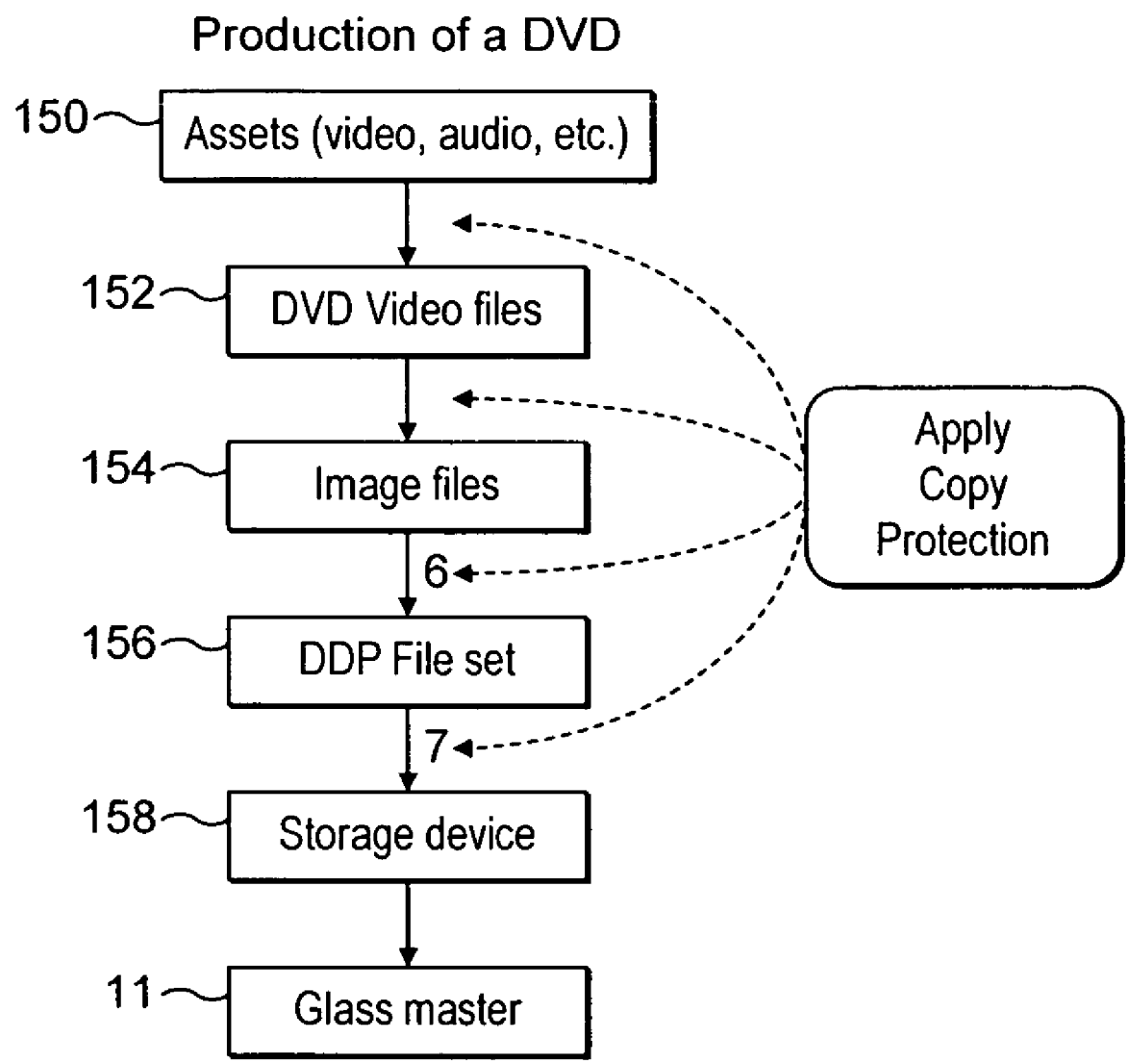
FIG. 10 shows schematically how the described copy protection techniques may be applied to different stages in the production of a DVD.

FIG. 10 illustrates the various stages of production of a DVD at which this form of copy protection may be applied. For example, a navigation structure as illustrated in FIGS. 7, 9, 12, 13, 14 and 15 may be created at the authoring stage or at the image building stage, or prior to the creation of the DDP File Set (stage 6) or after the DDP File Set has been created (stage 7).

Figure 11:
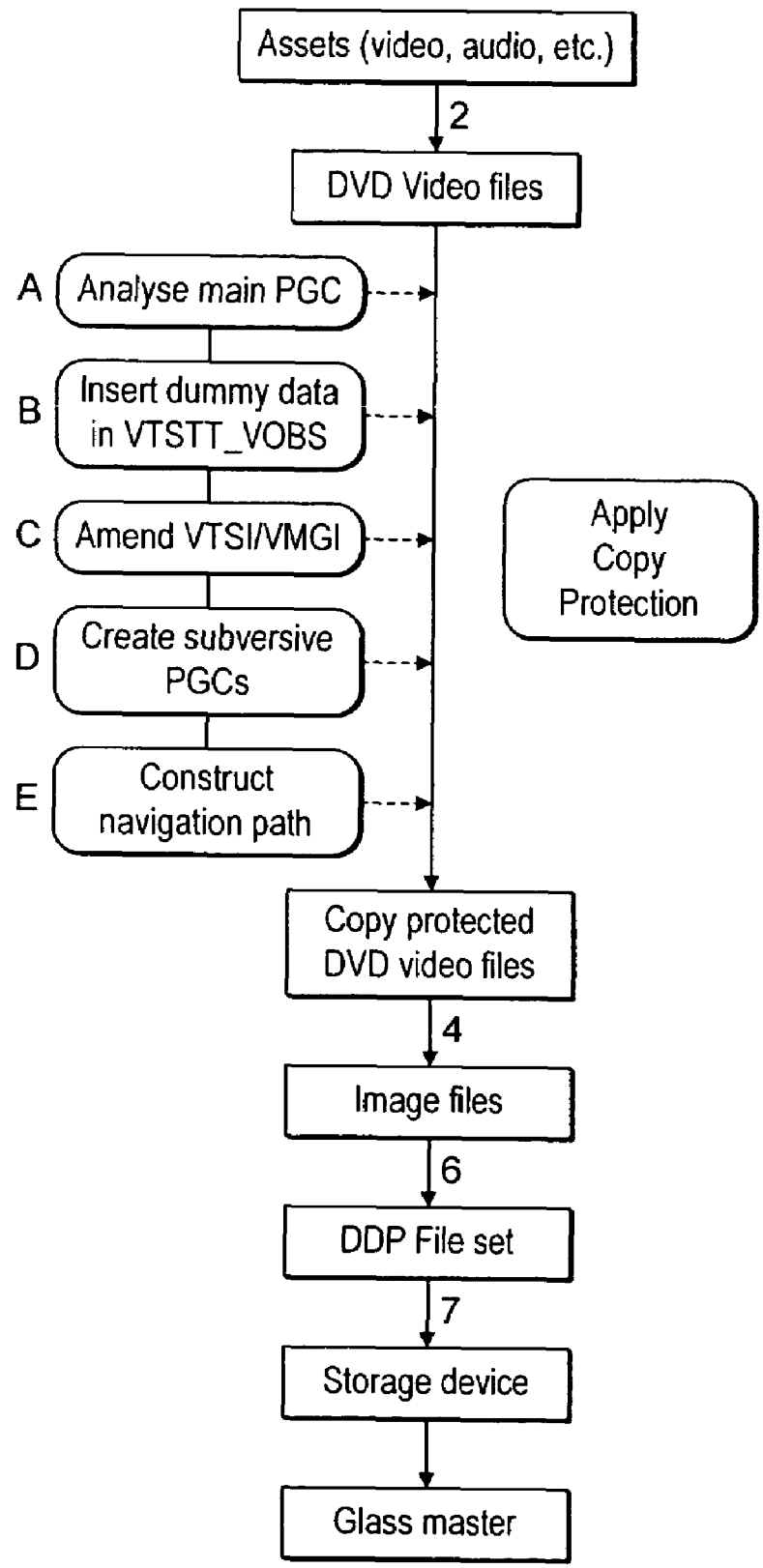
FIG. 11 shows in more detail how the copy protection illustrated in FIG. 7 may be applied to a DVD.

FIG. 11 illustrates in more detail how copy protection may be applied to a stage in FIG. 10, to the DVD video files of a DVD as shown, for example in FIG. 6 to result in, for example, a DVD as shown in FIG. 7. As can be seen in FIG. 11, the first step is to analyse the main program chain to identify its various features, for example, presentation time and number of programs. With this information it should be possible to determine which features of the main program chain should be common to all additional program chains, or at least one additional program chain. Following this false data, in the form of dummy and/or subversive data may be inserted, for example, as additional cells in the video objects.

Additionally, to ensure that the pointers of the main program chain to the main presentation are correctly preserved, the navigation information tables within the VTS information for VTS 1 and within the video manager information should be amended according to the changes operated in the video objects for VTS 1. Thus, any cells that have been relabelled and/or relocated by the addition of extra cells may be accounted for. The next step is to create the additional program chains. This information needs to be provided for VTS 1 by creating extra program chains which point to the false data, to a combination of false and genuine data, and/or are directed to the genuine main presentation data but in a scrambled or random order. The additional program chains have to have a suitable structure that satisfies the requirements described above that would render the additional program chains virtually indistinguishable from the main program chain.

Additionally and/or alternatively, additional program chains may be inserted in other Video Title Sets.

A navigation path is then constructed by means of the addition of suitable instructions in the pre-command, post-command, cell command, button command areas from the initial first play program. The navigation path goes through sufficient additional program chains to suitably confuse a person and/or an IFO parsing copying device attempting to copy the presentation data to eventually access the main program chain.

Figure 12:
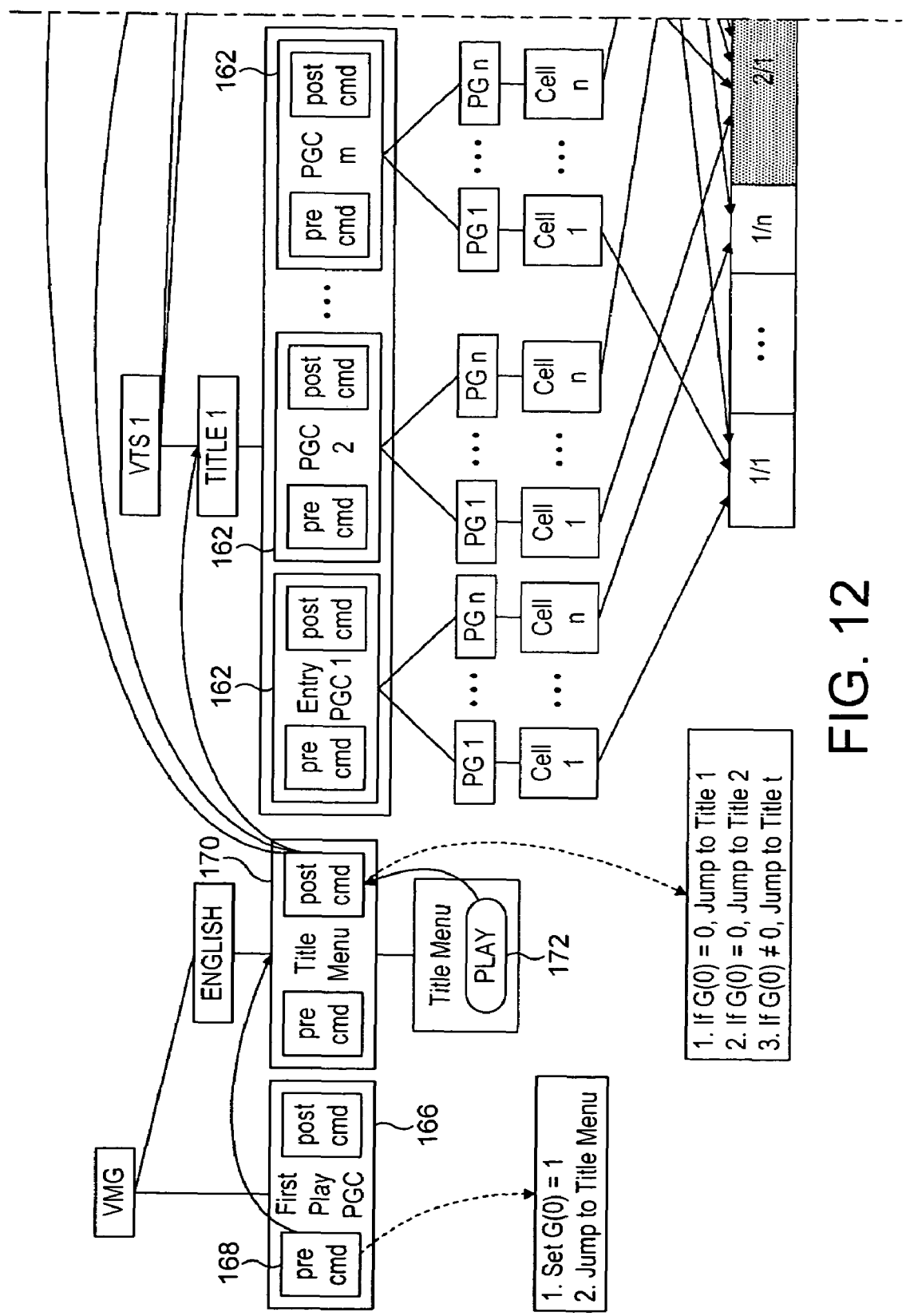
FIG. 12 shows schematically an example of how a correct program chain is chosen on a copy protected DVD.
Figure 12:
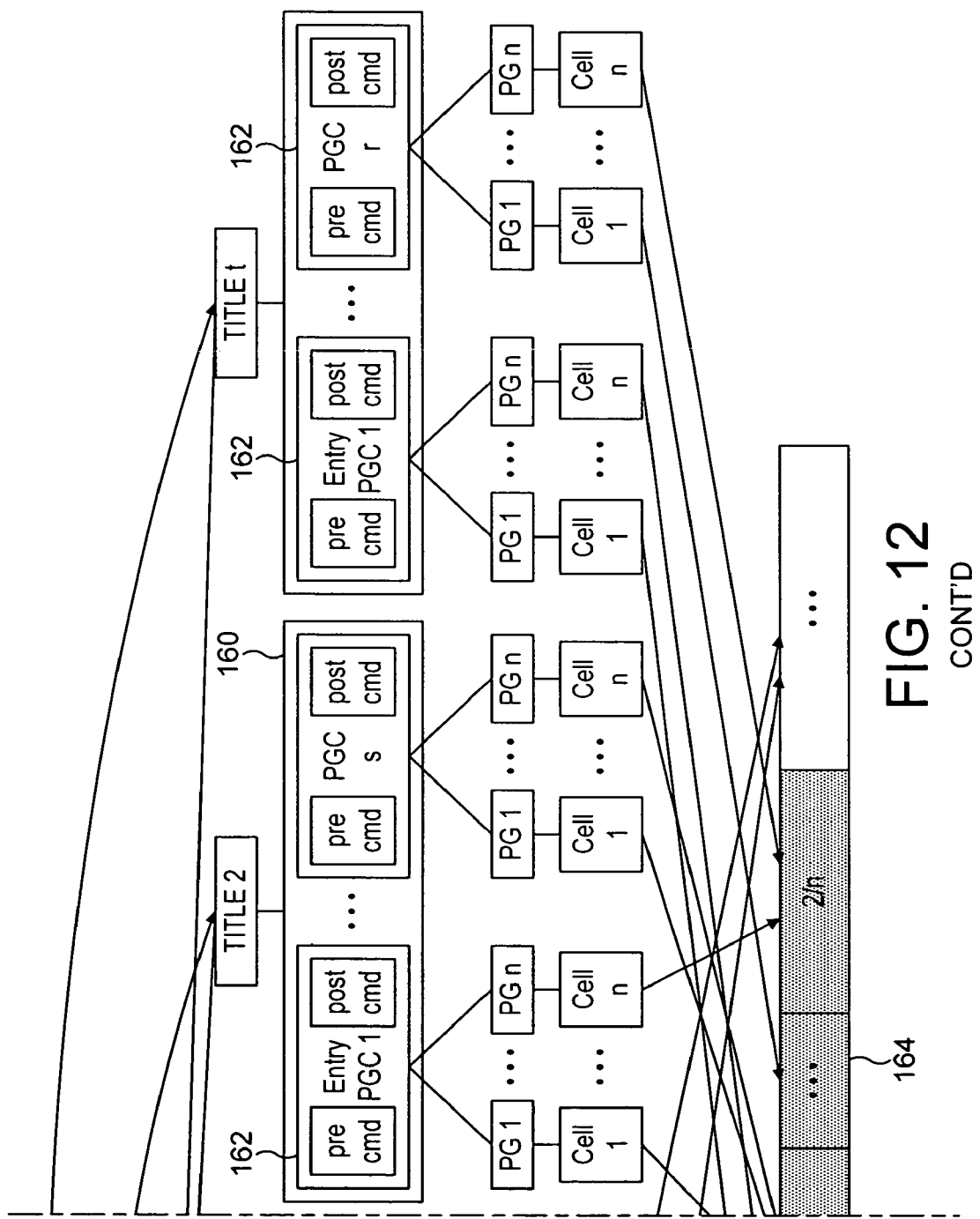

FIG. 12 shows an example of a DVD as copy protected in accordance with an embodiment of the present invention. FIG. 12 shows one example of how a correct program chain (PGC s) 160 may be navigated to among a number of additional program chains 162. As can be seen in FIG. 12, there are a number of program chains, each of which points to a varied selection of data cells. Of these, one program chain (PGC s) 160 accesses the presentation data 164 in the correct order. According to the example shown, on initialization of the DVD, in accordance with the first instruction within the pre-command area 168 of the first play PGC 166, a player sets a general parameter, in this case G(0), to 1. A further pre-command instruction then directs the player to "jump" to the title menu 170. When a user activates the PLAY button 172 of the DVD, the post-command area of the title menu program chain is consulted. The future direction of the player is dependent on the parameter G(0) as follows:

1. If G(0) = 0, Jump to Title 1;
2. If G(0) = 1, Jump to Title 2;
3. If G(0) ≠ 1, Jump to Title t When the DVD is played normally, the player sets the parameter G(0) to 1 upon execution of the First Play program chain, as described above. Therefore, when the PLAY button is pressed, G(0)=1 and the player is directed to Title 2 19. Hence the Entry program chain for Title 2 is executed and the main presentation data presented. After all the programs for the Entry PGC are executed, a post-command will direct the player to display again the Title Menu. If the value for G(0) is unknown, it would be impossible to determine the navigation path generated by the activation of the PLAY button upon normal playback of the optical disc and the conditions set in the post-command of the Title Menu may result in an incorrect navigation path erroneously leading to Title 1 (or Title t+1), resulting in subversive/unreadable/dummy data being accessed.

Figure 13:
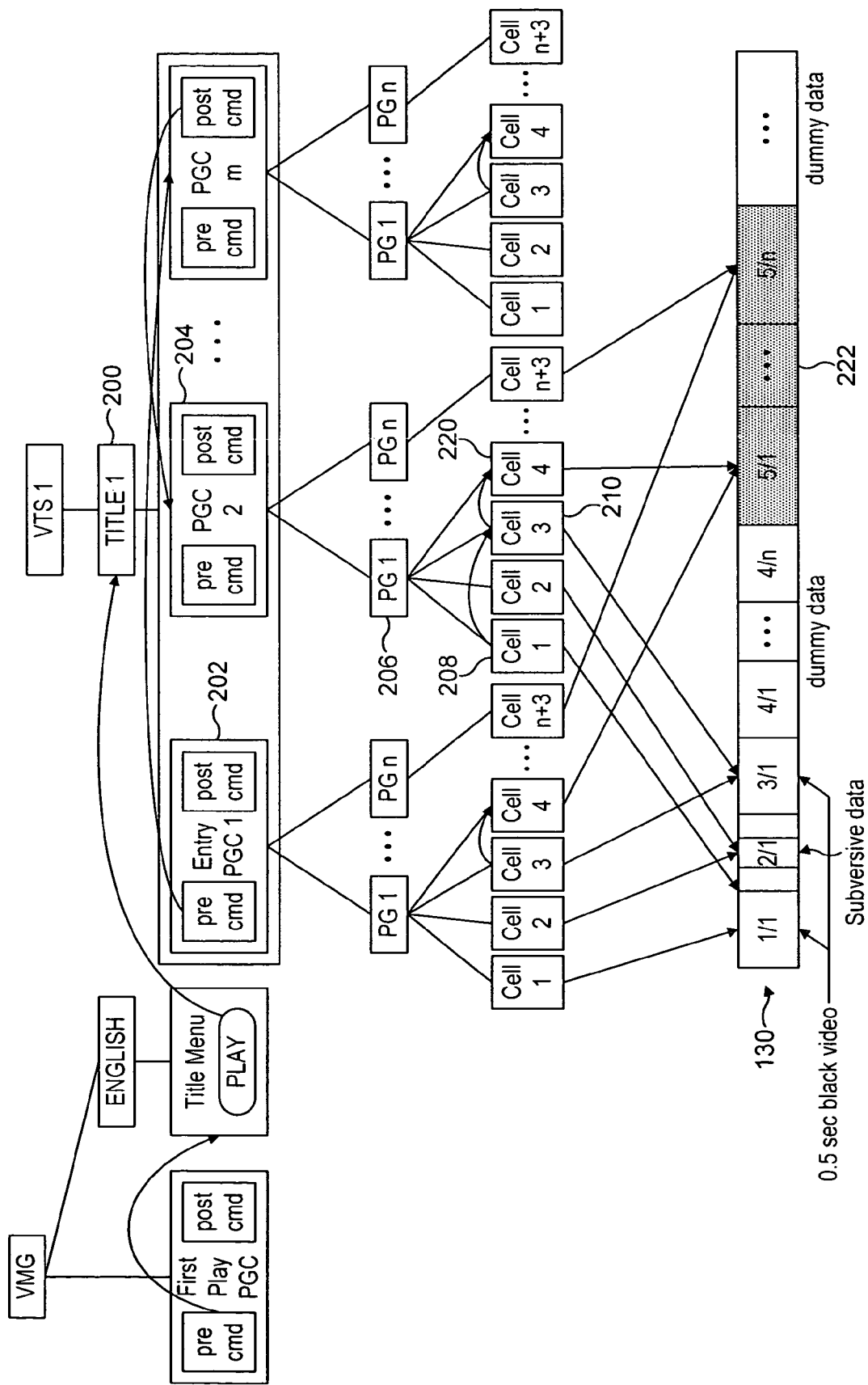
FIG. 13 shows a view similar to that of FIG. 12 but has two identical-looking program chains.

FIG. 13 shows a further example of a navigation structure very similar to the one illustrated in FIG. 9. In this example, the initial program chain of Title 1 200, Entry PGC 1 202 appears identical to the main program chain (PGC 2) 204 with respect to the presentation data that the subsequent programs point to. However the first cell 208 the player is directed to in PGC 2, following program 1 (PG1) 206 has a cell command directing the player to cell 3 210. By contrast, there is no cell command for cell 1 of Entry PGC 1, thus the player is directed to cell 1 where, if played, it would present a period of black video followed by subversive/dummy data pointed to by the subsequent cell 2. Thus if the Entry PGC 1 is mistaken as the correct main program chain, a copying device attempting to copy Entry PGC 1 will access the subversive data and should fail.

Figure 14:
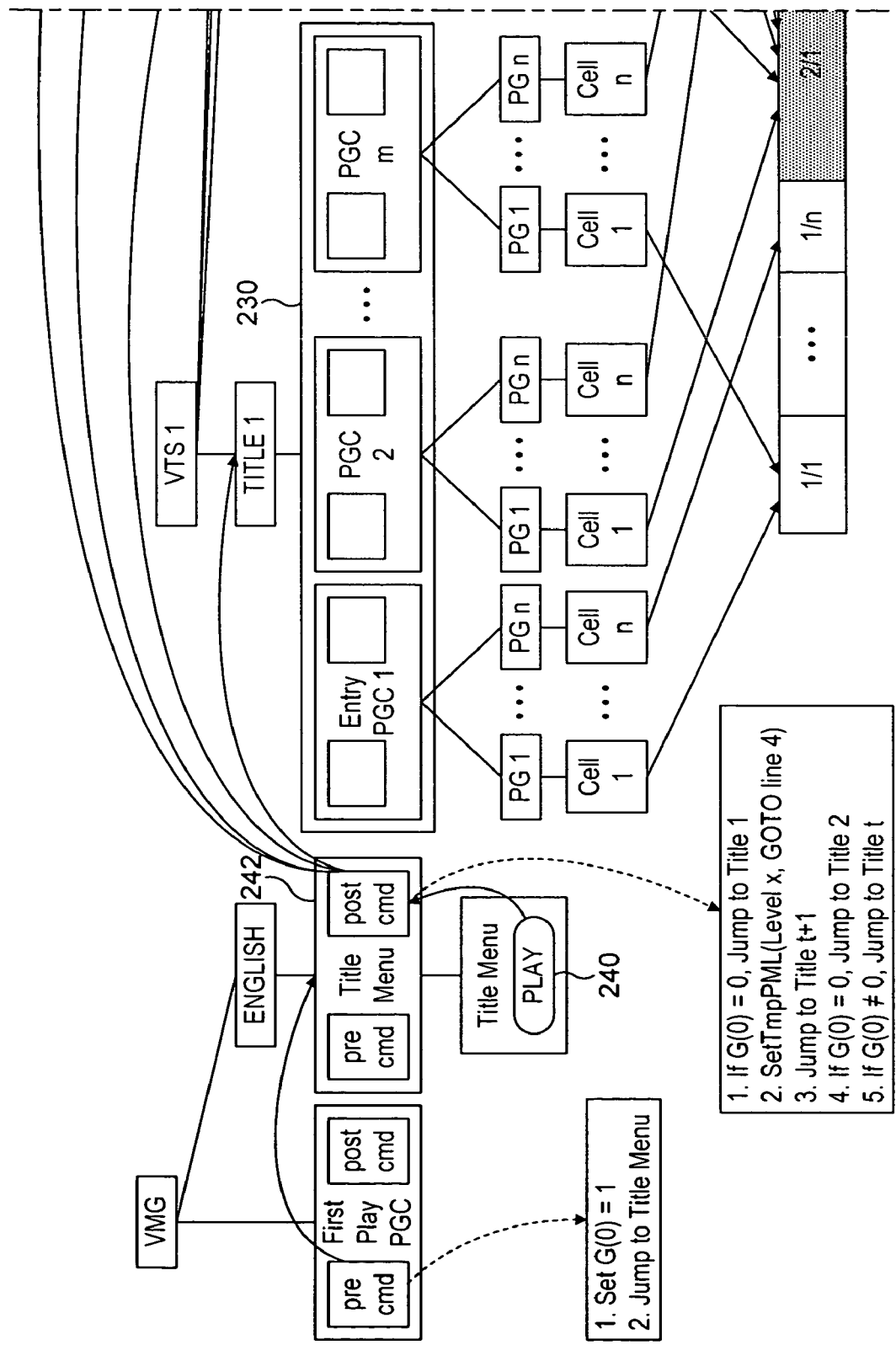
FIG. 14 shows how a correct program chain may be selected using parental management.
Figure 14:
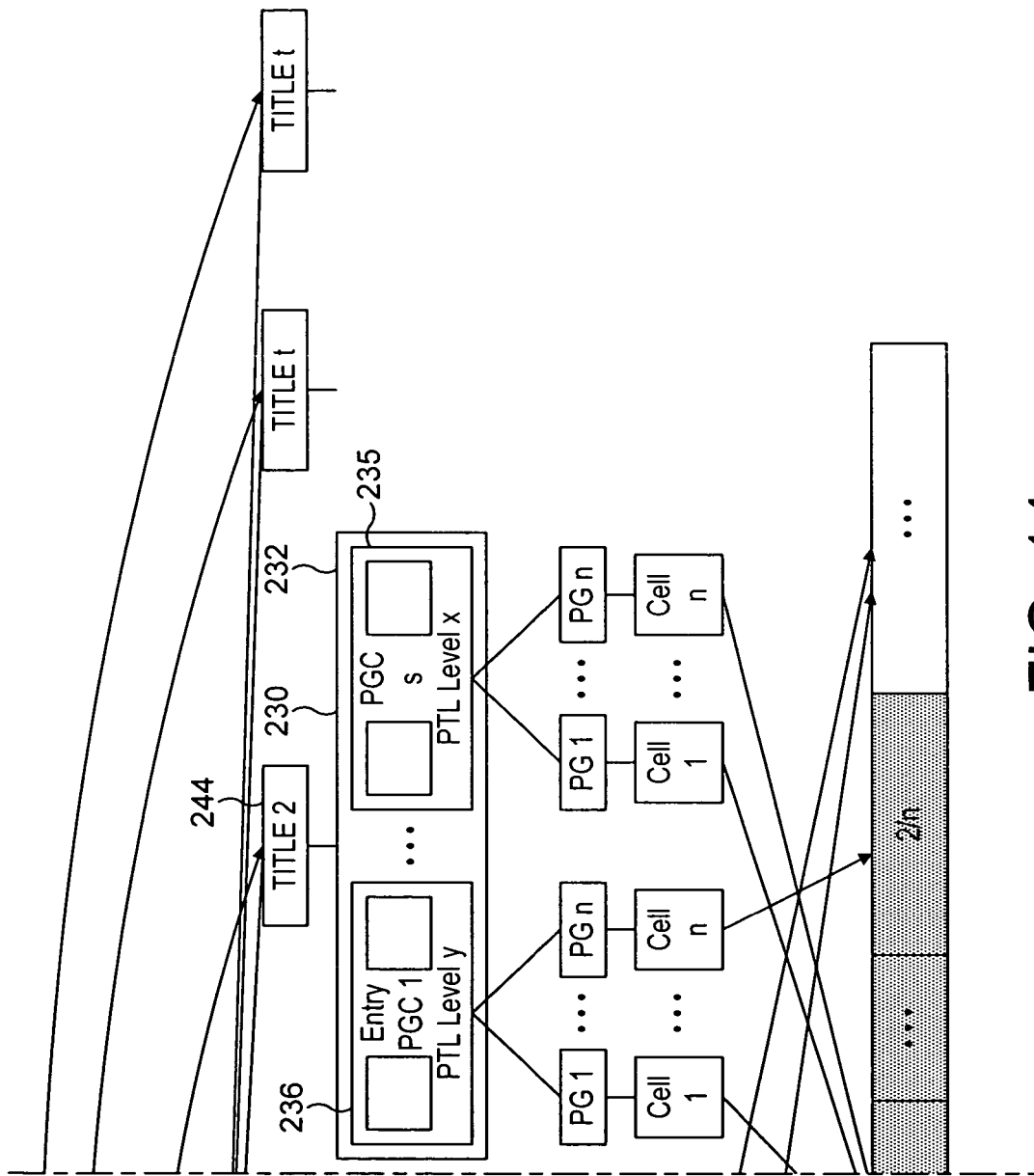

FIG. 14 shows an example of a DVD where the correct program chain is selected by means of a parental management system. As can be seen in FIG. 14, there is a program chain block (PGC block) associated with each title. In this embodiment, the main PGC block that leads to the main presentation 234 is a parental block and a parental level is assigned to each of the program chains within this block.

As an example, in the embodiment shown in FIG. 14, each program chain 236 in the parental block, other than the main program chain 238 that leads to the main presentation will have a parental level "y" that is more secure than the parental level "x" for the main program chain. During normal playback, once the "Play" button 240 in the title menu 242 is activated, the post-command phase for the title menu is executed. As previously, on execution of the First Play PGC by a player, the general parameter G(0) is set to 1. Upon initialization of the DVD and prior to the execution of any commands that may alter their value, all general parameters are initialized to the value 0. A further pre-command instruction then directs the player to "jump" to the title menu 242, where the activation of the PLAY button results in the post-command area of the title menu program chain being executed.

Therefore, in accordance with the conditions set in the post-command of the title menu, the command on line 1 is not executed, as G(0)≠0. Thus, the command to temporarily reset the parental level of the player is executed. This parental level is therefore set at "x".

The parental level is one of the many parameters governed by the player itself.

Others include determination of the language in which the DVD is to be aired and whether or not subtitles should be included.

The user is given the option of accepting this parental level setting and if the user agrees, the parental level of the player will be set to Level x, the parental level assigned to the main program chain. The setting of the parental level of the player to Level x occurs dynamically during normal playback of the main presentation. Thus, unless this DVD is being played normally, the navigation path to be followed would be unknown. In accordance with line 2 of the command area, when this level is accepted, the player is directed to line 4 of the command area. Following the remaining conditions, as the general parameter G(0)=1, the player is directed to Title 2 244. Once Title 2 is accessed, the program chain whose parental level matches the temporary parental level set in the player is selected for presentation. In the embodiment shown, this is the main program chain (PGC s) 235.

In the event that the player is not equipped with a parental management system, or if the user does not allow a change to the parental level, before the player is directed to Title 2 and to the main presentation, it will first be directed to Title t+1. Title t+1 may, for example, display a warning message to the user advising on the suitability of the presentation for youngsters. Alternatively, Title t+1 might originate a navigation path eventually leading to the main feature.

Figure 15:
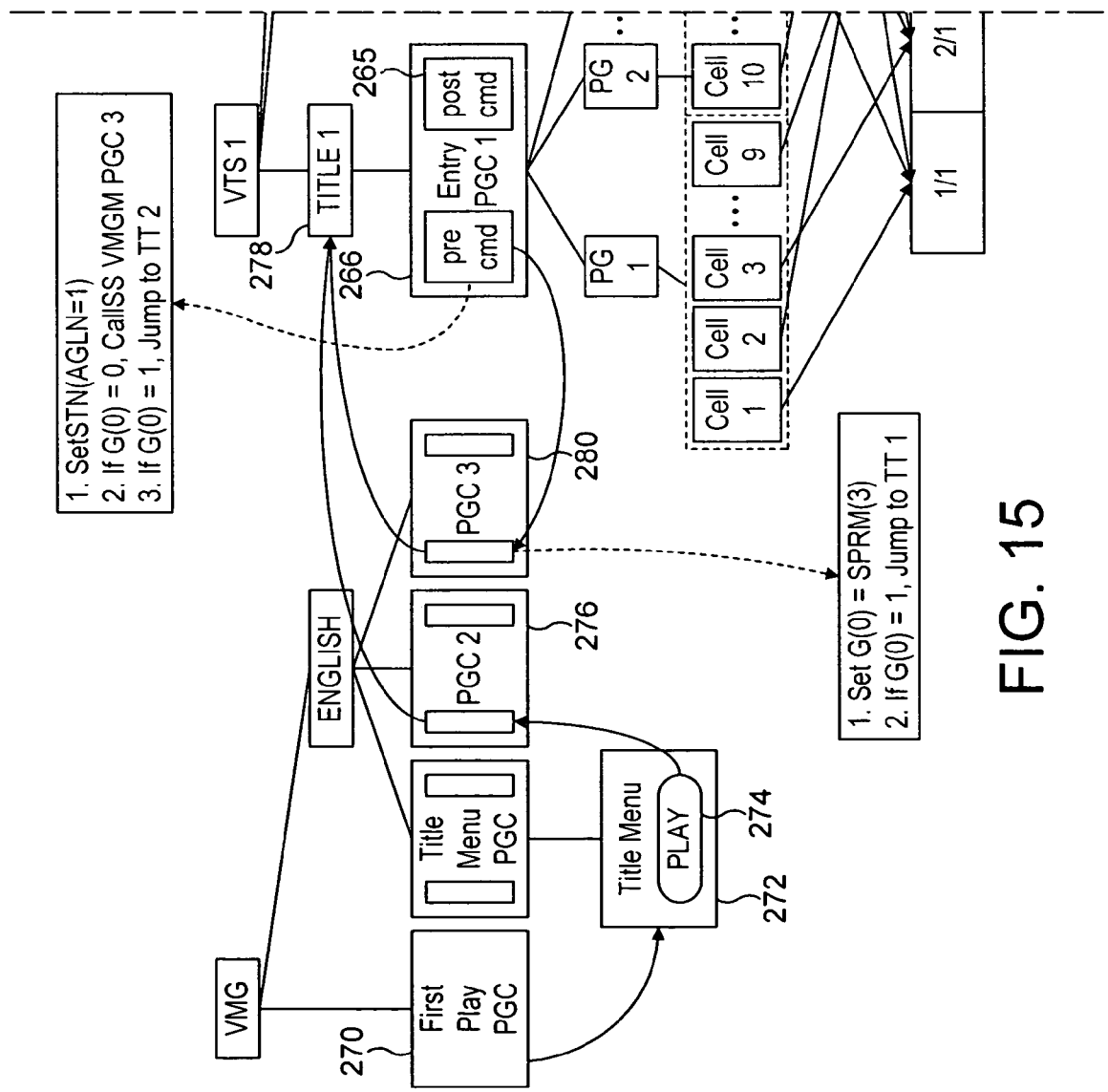
FIG. 15 shows schematically a view similar to that of FIG. 6 but illustrating an alternative embodiment.
Figure 15:
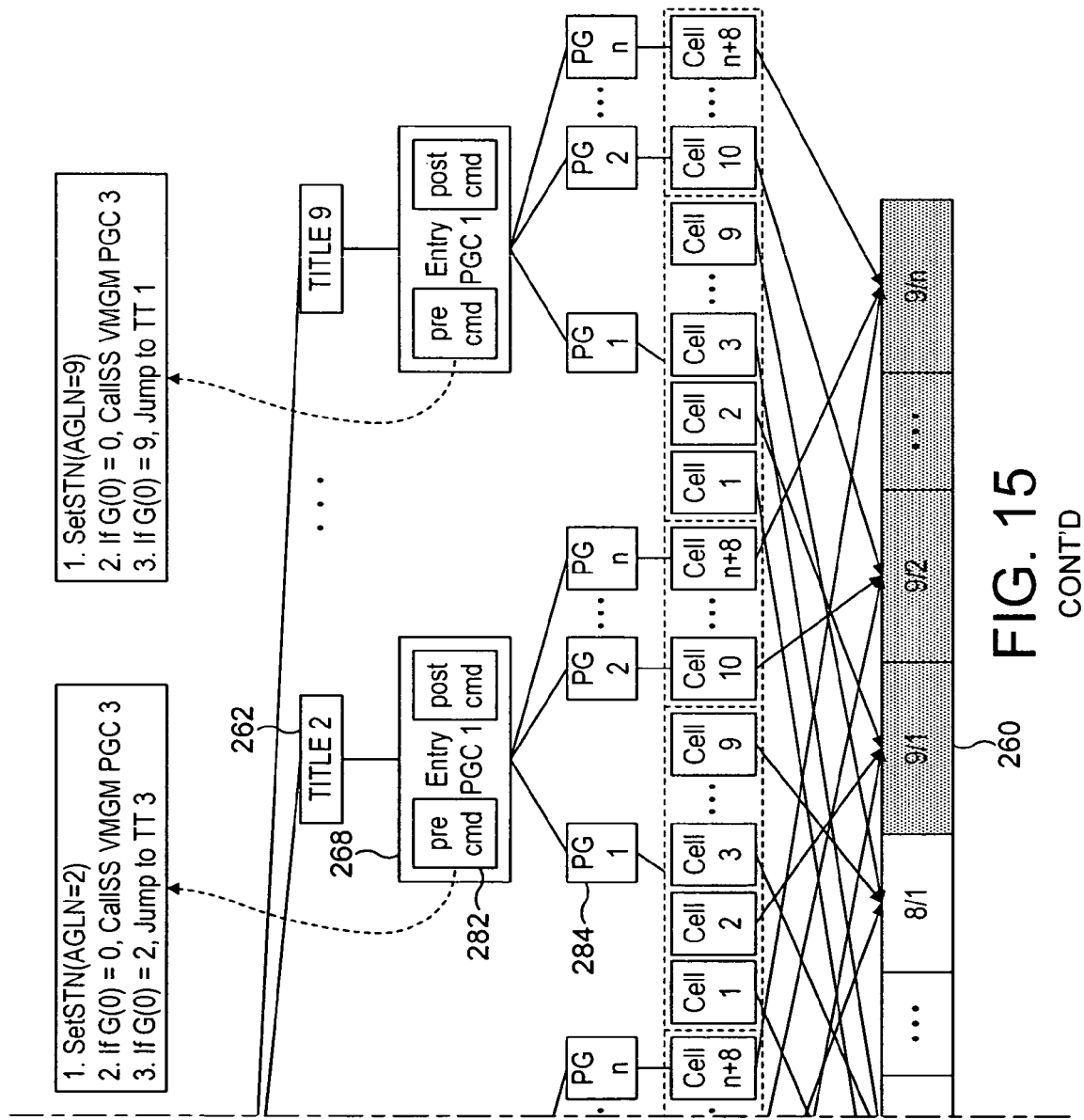

FIG. 15 shows a DVD protected by a further embodiment of the present invention. It will be known in the art that it is sometimes possible to alter the view of a DVD playing on a player such that the action can be seen from various different angles. In such situations, there will be a multiplicity of cells that show identical action but from a different perspective. It is important in each case that the different angles are co-ordinated such that the same sound-track can be applied whichever angle is chosen. Thus, the presentation time for each angle should be virtually the same.

In the embodiment shown in FIG. 15, the main presentation 260 is accessed through Title 2 262. Program 1 (PG 1) 264 of Title 2 leads to a cell block 266 that has replaced the unique cell of PG 1 shown in each of the other embodiments. The cell block shown is an angle block, where cell 2 of the angle block, corresponding to an Angle number 2, points to the first cell of the main presentation data. All other cells in the block are intended to appear as if they are directed to different angles of the same feature, however, in this embodiment all other cells in the block may point to dummy and/or subversive data within the cells.

It can be seen that the program chain of Title 1 and all subsequent titles that have been added to VTS 1 look identical to title 2, the main differences being in the immediate values used in the pre-commands.

However, as previously, conditions are contained within the pre/post commands of the various program chains such that on normal playback, the feature can only be accessed through Title 2.

In this case, the correct selection and presentation of cell 2 within the Angle block depends on the value of the system parameter for the angle number (SPRM(3)). As can be seen from the pre-command conditions 266 for each title, it is only the pre-command conditions of the Entry program chain 268 (Entry PGC 1) of Title 2 where the system parameter is set to Angle Number 2 (cell 2), that enables access to the main presentation data. In all the pre-command tables for the remaining titles, the system parameter (SPRM(3)) is set to values that will result in a dummy and/or subversive cell to be selected from the Angle Block.

During normal playback, on initialization the First Play program chain 270 is executed and the title menu 272 is displayed. When the user activates the PLAY button 274, program chain 2 (PG 2) 276 within the video manager is accessed and a jump to Title 1 278 within the pre-command phase is executed. The Entry program chain (Entry PGC 1) 265 of Title 1 is accessed and the player is further directed in accordance with the pre-command instructions of Entry PGC 1 as follows:

---
1. SetSTN(AGLN = 1)
2. If G(0) = 0, CallSS VMGM PGC 3
3. If G(0) = 1, Jump to TT 2
---

In accordance with line 1 of the command area, the system parameter SPRM (3) for the angle number (AGLN) is set at 1. The general parameter G(0) referred to in line 2 has not yet been set by the player and is therefore set at a default value of 0. Thus, line 2 of the pre-command table is executed and the player is directed to program chain 3 (PGC 3) 280 of the video manager.

In accordance with the pre-command instructions of PGC 3, G(0) is set to be equal to the SPRM(3), which at this time is equal to 1. Hence, a jump to Title 1 is then executed and the player is once more directed to Title 1 278.

Again, Entry PGC 1 268 of Title 1 is accessed and the pre-command instructions shown above are executed. This time, although the angle number is once again set at 1, instead of following line 2 of the pre-command conditions, as G(0) =1, in accordance with line 3, a jump to Title 2 262 is executed. Thus the player accesses Title 2.

Following a normal sequence, the entry program chain (Entry PGC 1) 268 of Title 2 is accessed. The pre-command instructions of Entry PGC 1 268 are as follows:

---
1. SetSTN(AGLN = 2)
2. If G(0) = 0, CallSS VMGM PGC 3
3. If G(0) = 2, Jump to TT 2
---

In accordance with line 1 of the pre-command instructions, the angle number is set at 2. The conditional commands on lines 2 and 3 are not executed because G(0) is not equal to 0 nor 2. Thus, program 1 (PG 1) 264 is executed. The pointer to be presented within the cell block in PG 1 is determined by the value of the system parameter for the angle number. This value was set at 2 in the pre-command instructions of Entry PGC 1 268. Hence, cell 2, which as discussed above, points to the main presentation data, is selected for presentation. Following this, programs 2 to n, comprising cells 10 to n+8, are accessed in sequence, thus displaying the main presentation data 260.

In this embodiment, a person attempting to the copy the DVD would first be presented by numerous program chains which all point to the presentation data. Thus each program chain appears to be identical in structure to all others. Within these program chains, it would be expected that even those more experienced in copying DVDs, without extensive investigation, would believe that cells 1 and 3 to 9 of the cell block access different angles of the same presentation. Thus, without the conditional information supplied by the pre-command tables, it would be near to impossible for a person and/or a copying device attempting to copy the DVD to determine exactly which cells should be copied. As set out above, the values for the parameters that define the conditions of the pre-command tables to be executed only become available during normal playback of the DVD on a player or by means of a virtual machine emulating a player.

It will be appreciated from the above examples that the inclusion of additional program chains, of which some are virtually indistinguishable from the main program chain and/ or lead to unreadable, erroneous, subversive and/or genuine data accessed in a non-sequential order, should make it problematic for a person and/or a copying device attempting to copy a DVD.

It will be appreciated that modifications of, and alterations to, the embodiments as bed and illustrated may be made within the scope of this application.

What is claimed is:

1. A machine readable copy protected optical disc having embodied thereon content and control data, the content and control data comprising:

at least one region of genuine data, at least one region of false data, and the control data having been written on the optical disc by a mastering device, the control data including navigational information to enable access to the content, wherein the navigational information includes at least one main program chain leading to the region of genuine data, wherein the navigational information also includes one or more further program chains, each further program chain leading to the at least one region of false data, and/or incompletely and/or incorrectly leading to the region of genuine data, wherein the structure of at least one of the further program chains resembles the structure of the main program chain, wherein the main program chain including at least one program, the at least one program including at least one cell incorrectly leading to the region of genuine data, and wherein the control data is arranged to generate a dynamic navigational path to enable access to the main program chain upon the setting of parameters associated with a player or a user.

2. A machine readable copy protected optical disc according to claim 1, wherein the region of false data comprises one or more of: incorrect data, dummy data and subversive data.

3. A machine readable copy protected optical disc according to claim 1, wherein the content is arranged in a data area provided between a Lead-In and a Lead-Out, the data area comprising a hierarchical data structure having several levels and having navigational information associated with the individual levels.

4. A machine readable copy protected optical disc according to claim 1, wherein the navigational information further includes one or more titles, at least one of which forms part of the navigation path leading to the main program chain.

5. A machine readable copy protected optical disc according to claim 1, wherein content files are video object (VOB) files arranged in individual cells which can each be accessed by respective pointers in an information (IFO) file.

6. A machine readable copy protected optical disc according to claim 5, wherein each program chain comprises further navigational information corresponding to one or more programs leading to the individual cells of content files.

7. A machine readable copy protected optical disc according to claim 6, wherein the navigational path is generated in accordance with conditional instructions associated with one or more of the titles, program chains, cells and/or menu buttons.

8. A machine readable copy protected optical disc according to claim 7, wherein parameters required to satisfy the conditional instructions to enable generation of the navigational path enabling access to the main program chain are arranged to be set by a user interface and/or by a player during normal playback of the optical disc.

9. A computer-implemented method of copy protecting an optical disc having embodied thereon content and control data, the content including at least one region of genuine data and at least one region of false data, the method comprising:
providing control data including navigational information to enable access to the content, wherein the content having been written on the optical disc by a mastering device, wherein the navigational information includes at least one main program chain leading to the region of genuine data, wherein the navigational information also includes one or more further program chains, each further program chain leading to the at least one region of false data, and/or incompletely and/or incorrectly leading to the region of genuine data, wherein the structure of at least one of the further program chains resembles the structure of the main program chain, wherein the main program chain including at least one program, the at least one program including at least one cell incorrectly leading to the region of genuine data; and
providing additional control data arranged to generate a dynamic navigational path to enable access to the main program chain upon the setting of parameters associated with a player or a user.

10. A computer-implemented method of copy protecting an optical disc according to claim 9, wherein the region of false data comprises one or more of: incorrect data, dummy data and subversive data.

11. A computer-implemented method of copy protecting an optical disc according to claim 9, wherein the content is arranged in a data area provided between a Lead-In and a Lead Out, the data area comprising a hierarchical data structure having several levels and having navigational information associated with the individual levels.

12. A computer-implemented method of copy protecting an optical disc according to claim 9, wherein the navigational information further includes one or more titles, at least one of which forms part of the navigation path leading to the main program chain.

13. A computer-implemented method of copy protecting an optical disc according to claim 9, wherein the content files are video object (VOB) files arranged in individual cells which can each be accessed by respective pointers in an information (IFO) file.

14. A computer-implemented method of copy protecting an optical disc according to claim 13, wherein each program chain comprises further navigational information corresponding to one or more programs leading to the individual cells of content files.

15. A computer-implemented method of copy protecting an optical disc according to claim 14, further comprising:
associating conditional instructions with one or more of the program chains, cells and menu buttons; and
generating the navigational path in accordance with said conditional instructions.

16. A computer-implemented method of copy protecting an optical disc according to claim 15, further comprising:
providing parameters required to satisfy the conditional instructions enable generation of the navigational path enabling access to the main program chain, wherein said parameters are arranged to be set by a user interface and/or by a player during normal playback of the optical disc.

17. A computer-implemented method comprising:
providing main presentation data on an optical disc using a mastering device;
providing a main program chain correctly pointing to the main presentation data;
providing a plurality of false program chains, each of which incorrectly pointing to the main presentation data, the plurality of false program chains resembling the main program chain; and
providing at least one program in the main program chain, the at least one program including at least one cell incorrectly pointing to the main presentation data.

18. The computer-implemented method as claimed in claim 17 including enabling access to the main program chain upon the setting of parameters associated with a player.

19. The computer-implemented method as claimed in claim 17 wherein incorrectly pointing to the main presentation data includes pointing to a region of false data including one or more of: incorrect data, dummy data, and subversive data.

20. The computer-implemented method as claimed in claim 17 including providing one or more titles, at least one of which forms part of a navigational path leading to the main program chain.

21. The computer-implemented method as claimed in claim 17 including:
associating conditional instructions with the main program chain, one or more of the plurality of false program chains, cells, and menu buttons; and
generating a navigational path leading to the main program chain in accordance with the conditional instructions.

22. The computer-implemented method as claimed in claim 21 including:
providing parameters required to satisfy the conditional instructions arranged to enable generation of the navigational path enabling access to the main program chain, wherein said parameters are arranged to be set by a user interface or by a player during normal playback of the optical disc.

23. The computer-implemented method as claimed in claim 17 wherein the at least one cell incorrectly pointing to the main presentation data includes a pointer to another cell in the same program in the main program chain.

24. The computer-implemented method as claimed in claim 17 including providing at least one second cell in the at least one program in the main program chain, the at least one second cell correctly pointing to the main presentation data.

25. A machine readable optical disc including functional data embodied thereon, the functional data, when operated upon by the machine, causing the machine to:
provide main presentation data on an optical disc;
provide a main program chain correctly pointing to the main presentation data;
provide a plurality of false program chains, each of which incorrectly pointing to the main presentation data, the plurality of false program chains resembling the main program chain; and provide at least one program in the main program chain, the at least one program including at least one cell incorrectly pointing to the main presentation data.

26. The machine readable optical disc as claimed in claim 25 wherein the functional data being further configured to enable access to the main program chain upon the setting of parameters associated with a player.

27. The machine readable optical disc as claimed in claim 25 wherein incorrectly pointing to the main presentation data includes pointing to a region of false data including one or more of:

incorrect data, dummy data, and subversive data.

28. The machine readable optical disc as claimed in claim 25 wherein the functional data being further configured to provide one or more titles, at least one of which forms part of a navigational path leading to the main program chain.

29. The machine readable optical disc as claimed in claim 25 wherein the functional data being further configured to associate conditional instructions with the main program chain, one or more of the plurality of false program chains, cells, and menu buttons; and to generate a navigational path leading to the main program chain in accordance with the conditional instructions.

30. The machine readable optical disc as claimed in claim 29 wherein the functional data being further configured to provide parameters required to satisfy the conditional instructions arranged to enable generation of the navigational path enabling access to the main program chain, wherein said parameters are arranged to be set by a user interface or by a player during normal playback of the optical disc.

31. The machine readable optical disc as claimed in claim 25 wherein the at least one cell incorrectly pointing to the main presentation data includes a pointer to another cell in the same program in the main program chain.

32. The machine readable optical disc as claimed in claim 25 wherein the functional data being further configured to provide at least one second cell in the at least one program in the main program chain, the at least one second cell correctly pointing to the main presentation data.

* * * * *